United States Patent [19]

Makino

[11] Patent Number: 5,111,219
[45] Date of Patent: May 5, 1992

[54] Fθ LENS AND IMAGE APPARATUS USING THE SAME

[75] Inventor: Jun Makino, Yokohama, Japan

[73] Assignee: Canon Kabushiki Kaisha, Tokyo, Japan

[21] Appl. No.: 712,184

[22] Filed: Jun. 7, 1991

[30] Foreign Application Priority Data

Jun. 15, 1990 [JP] Japan .................. 2-157013

[51] Int. Cl.$^5$ .............................................. G01D 9/42
[52] U.S. Cl. ..................................... 346/108; 359/662
[58] Field of Search ................ 346/108; 359/662, 719, 359/728

[56] References Cited

U.S. PATENT DOCUMENTS

| | | | |
|---|---|---|---|
| 4,866,459 | 9/1989 | Tokita et al. | 346/108 |
| 4,926,195 | 5/1990 | Murahashi et al. | 346/108 |
| 4,989,961 | 2/1991 | Yoshioka | 359/713 |
| 5,038,156 | 8/1991 | Kuroda | 346/108 |

Primary Examiner—A. T. Grimley
Assistant Examiner—Nestor R. Ramirez
Attorney, Agent, or Firm—Fitzpatrick, Cella, Harper & Scinto

[57] ABSTRACT

An fθ lens acting to effect uniform speed scanning while causing a light beam deflected at a uniform angular velocity by the deflecting surface of a deflector to be imaged on a plane to be scanned, wherein the shape of the curved surface of at least the lens surface of the lens which is adjacent to the deflection point side of the deflecting surface in the main scanning plane is an aspherical shape and particularly, near the optical axis, in at least the main scanning plane, this aspherical shape is convex toward the deflection point, and when the radius of curvature of this convex shape near the optical axis in the main scanning plane is $r_1$ and the focal length of the fθ lens near the optical axis in the main scanning plane is fm, $$0 \leq r_1 < |fm|$$

and yet, when with the point of intersection between the lens surface adjacent to the deflection point side and the optical axis as the origin and with the coordinates system of the x-axis plotted in the direction of the optical axis and the coordinates system of the y-axis plotted in the main scanning plane perpendicularly thereto, the surface shape in the main scanning plane is expressed as a function $S_1(y)$ in which y is a variable, and when the maximum effective diameter of this surface in the main scanning plane is Ymax, $S_1(y)$ is defined between 0 and Ymax, and when $r_1 <$ Ymax, $$-1 < S_1(r_1)/r_1 < 0.5$$

and when $r_1 \geq$ Ymax, $$-1 \times Ymax/r_1 < S_1(Ymax)/Ymax < 0.5 \times Ymax/r_1.$$

24 Claims, 13 Drawing Sheets

Fθ LENS AND IMAGE APPARATUS USING THE SAME

BACKGROUND OF THE INVENTION

1. Field of the Invention

This invention relates to an fθ lens used in a laser scanning optical system or the like, and particularly to an fθ lens comprised of a lens and an image forming apparatus using the same.

2. Related Background Art

Heretofore, in a scanning optical system, chiefly a laser source such as a semiconductor laser has been used as a light source and light from the light source has been imaged on a plane to be scanned through an optical system to thereby form a laser spot, and the laser source has been subjected to modulation conforming to image information while the laser spot is scanned on the plane to be scanned by a deflector such as a polygon mirror disposed in the optical path, whereby a desired image has been formed on the plane to be scanned.

Where such a laser scanning optical system is particularly an optical system which scans a laser by the rotation of a deflector such as a polygon mirror, it is desirable that a laser spot be uniformly formed on the whole plane to be scanned (that is, the curvature of image field of a lens system be corrected) and the angle of rotation of the deflector and the position of the spot formed on the plane to be scanned have a proportional relation (that is, the speed of the spot scanned on the plane to be scanned become constant on the whole plane to be scanned, i.e., have constant speed property.). For this purpose, a correcting optical system is used between the polygon mirror and the plane to be scanned. Usually, this lens for correction used in the laser scanning system is a lens called an fθ lens having such a distortion characteristic that the angle of incident light and the image height are in a proportional relation, so as to have constant speed property.

Further, even where a mirror surface which is the deflecting surface of the deflector has an inclination, it is regarded as desirable from the viewpoints of the manufacture of the deflector and the quality of image to have optical correcting means so that the position of the scanning line may not deviate (inclination correcting function).

There have been made numerous inventions relating to an fθ lens having such inclination correcting function. Particularly, regarding a type in which the number of constituent lenses is two or more, many inventions have been made and put into practical use.

In contrast, several fθ lenses in which the lens system is constructed of a lens have also been devised as simpler optical systems.

As seen, for example, in Japanese Laid-Open Patent Application Nos. 55-7727 and 58-5706, there is an example in which an fθ lens is comprised of a spherical lens.

Also, like Japanese Laid-Open Patent Application Nos. 63-50812 and 1-224721, there is an example in which a toric surface is used as a lens surface and yet an fθ lens is constructed.

Further, in Japanese Laid-Open Patent Application Nos. 54-87540 and 54-98627, there is disclosed an example in which an aspherical surface term is introduced into a single lens, and in Japanese Laid-Open Patent Application Nos. 62-138823, 63-157122 and 2-87109, there is disclosed an example in which a high-order aspherical surface is introduced into a lens surface to thereby construct an fθ lens.

However, in the plano-convex fθ lens disclosed in Japanese Laid-Open Patent Application No. 55-7727 among the above-mentioned examples of the prior art, constant speed property is corrected, but curvature of image field remains and it is difficult to keep the uniformity of spot. In this case, if design is made such that the size of the effective scanning width by this lens is sufficiently large relative to the plane to be scanned, curvature of image field can be made small, but the entire apparatus will become bulky, and this cannot be said to be practical.

In Japanese Laid-Open Patent Application No. 58-5706, the fθ lens comprising a spherical lens is made into a meniscus lens having its concave surface facing the deflecting surface side to thereby accomplish aberration correction, but as in Japanese Laid-Open Patent Application No. 55-7727, an attempt to sufficiently correct curvature of image field and constant speed property at a time would give rise to the necessity of making the distance between this lens and the plane to be scanned great.

In Japanese Laid-Open Patent Application No. 63-50812, a toric lens is used to make a lens in which curvature of image field and constant speed property are corrected. Particularly, the aberrations in the main scanning plane (curvature of image field and constant speed property) and the aberrations in the sub-scanning plane perpendicular to the main scanning plane can be corrected independently and therefore, better correction than in the aforedescribed two examples is accomplished. Further, the deflecting surface and the plane to be scanned are made into a conjugate relation on the sub-scanning cross-section, thereby accomplishing the correction of the inclination of the mirror surface of the deflector as well. The distance from the deflecting surface to the plane to be scanned is also kept relatively small. However, a toric lens, if viewed only in the main scanning plane, is equivalent to a spherical single lens, and it is difficult to correct curvature of image field and constant speed property at a time. Therefore, to provide a lens shape in which aberrations are good, it is necessary to make the thickness t of the lens considerably great relative to the focal length f, i.e., $0.3 < t/f < 0.5$, as described in this patent application. For this reason, as an actual lens, the manufacture thereof is difficult and the use of a single lens will lead to no merit.

In Japanese Laid-Open Patent Application No. 1-224721, a toric lens is also used and further, design is made such that convergent light is caused to enter the toric lens, thereby accomplishing aberration correction, but as in Japanese Laid-Open Patent Application No. 63-50812, even in the main scanning plane alone, it is difficult to make curvature of image field and constant speed property compatible. In this example, as described in the specification thereof, constant speed property is restricted to such a degree of correction that it can be electrically corrected (expressed as substantially constant speed in the specification), whereby the correction of curvature of image field is effected preponderantly. Thus, during image writing, the timing of image information is varied to thereby correct the distortion of the written image. In this case, however, constant speed property is under-corrected and thus, the speed of the spot on the plane to be scanned varies at all times, and the quantity of light received per unit time by the plane to be scanned is varied. It is possible to correct this by varying the quantity of laser light produced from the light source, but this will lead to too many correcting circuits, which does not mean the obtainment of the merit of using a single lens.

In the case of a single lens whose lens shape is a spherical shape in the main scanning plane as in these examples, it has been difficult to realize an fθ lens having a sufficient characteristic.

In contrast, as described in Japanese Laid-Open Patent Application Nos. 54-87540 and 54-98627, there is known an example in which an aspherical term is introduced to construct an fθ lens.

The aspherical lenses described in Japanese Laid-Open Patent Application Nos. 62-138823, 63-157122 and 1-99013 are such that the shape of the lens near the optical axis thereof is that of a meniscus lens in which the deflecting surface side is a concave surface or a biconvex lens, and in any of these lenses, the thickness t of the lens is great relative to the width of the plane to be scanned.

The example shown in Japanese Laid-Open Patent Application No. 62-138823 is a meniscus lens in which the deflecting surface side is a concave surface or a biconvex lens, but the thickness of the lens is 20 mm at smallest relative to the effective scanning width of 200 mm.

The example shown in Japanese Laid-Open Patent Application No. 63-157122 is a meniscus lens in which near the optical axis, the deflecting surface side is a concave surface, but the thickness of the lens is 30 mm at smallest relative to the maximum scanning width (the scanning width corresponding to the angle of view mentioned as the maximum scanning angle θmax in the specification; 254 mm or so in any embodiment).

The example shown in Japanese Laid-Open Patent Application No. 2-87109 is a lens which is biconvex near the optical axis and therefore, the thickness of the lens is also great.

It is difficult to make such aspherical lenses by carrying out the processing as is done in the manufacture of ordinary spherical lenses. Therefore, processing and molding are carried out by the use of materials such as plastics rich in workability to make such aspherical lenses, thereby solving the problem in manufacture. However, plastics are generally apt to be affected by environmental fluctuations, and are particularly apt to be varied in refractive index by humidity and temperature. Especially, where the thickness of the lens is great, a light beam passing therethrough is greatly subjected to a variation in refractive index and thus, the imaging position is varied by environmental fluctuations. Further, a great thickness of the lens is a factor which increases internal homogeneity, distortion, molding termination time, etc. in carrying out processing and molding.

Thus, the aspherical lenses known as the above-described three examples of the prior art could not be said to be practical because of their great lens thicknesses. Particularly in these examples, the shape of the deflection point side lens surface in the main scanning plane is not appropriate and therefore, to satisfy the performance necessary as an fθ lens, it is necessary to make the lens thicker than the practical range, and this has been low in realizability.

SUMMARY OF THE INVENTION

The present invention has been made in view of the above-noted circumstances and the object thereof is to provide an fθ lens which satisfies the performance required of an fθ lens and yet whose lens thickness is kept small and which is suitable for plasticization and comprises a single lens, and an image forming apparatus which uses such fθ lens, whereby the apparatus can be made compact and thin.

The above object of the present invention is achieved by the fθ lens of the present invention which will hereinafter be described and an image forming apparatus using the same.

DESCRIPTION OF THE PREFERRED EMBODIMENTS

Figure 1:
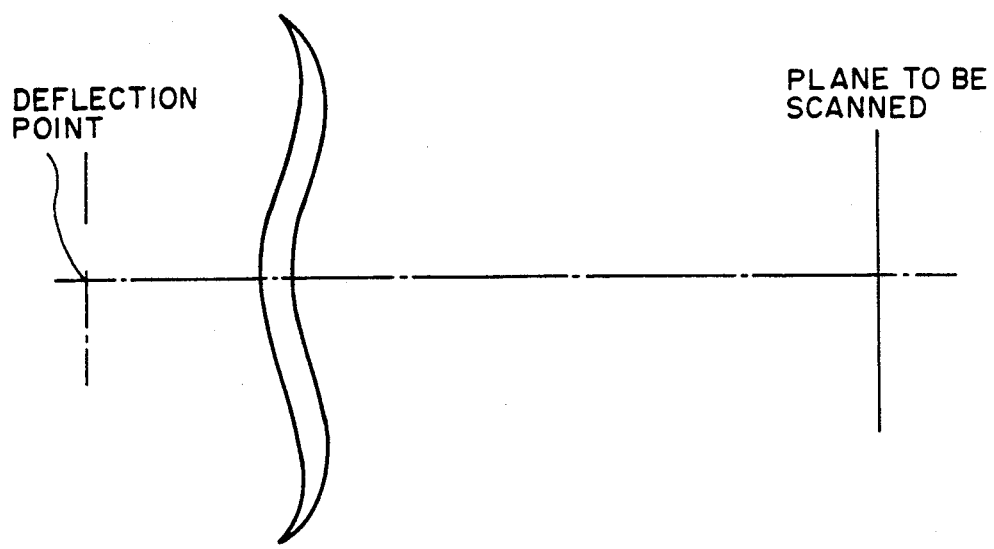
FIG. 1 is a cross-sectional view of a first embodiment of the present invention in the main scanning plane.

In the fθ lens of the present invention which is an fθ lens comprised of a lens, the shape of the curved surface of at least the lens surface of said lens which is adjacent to the deflection point side of a deflector in the main scanning plane is an aspherical shape and particularly, near the optical axis, in at least the main scanning plane, this aspherical shape is convex toward the deflection point, and when the radius of curvature of this convex shape near the optical axis in the main scanning plane is $r_1$ and the focal length of the fθ lens near the optical axis in the main scanning plane is fm, there is the relation that $$0 \geq r_1 < |fm| \tag{1}$$

between $r_1$ and the absolute value of fm and yet, when with the point of intersection between the lens surface adjacent to the deflection point side and the optical axis as the origin and with the coordinates system of the x-axis plotted in the direction of the optical axis and the coordinates system of the y-axis plotted in the main scanning plane perpendicularly thereto, the surface shape in the main scanning plane is expressed as a function $S_1(y)$ in which y is a variable, and when the maximum effective diameter of this surface in the main scanning plane is Ymax and $S_1(y)$ is defined between 0 and Ymax, and when as shown, the relation between the aspherical shape and the radius of curvature near the optical axis is $r_1 <$ Ymax, that is, when a spherical lens having the radius of curvature $r_1$ cannot have the effective diameter Ymax (e.g. FIG. 2-a), the lens shape $S_1(r_1)$ at a position $y = r_1$ satisfies $$-1 < S_1(r_1)/r_1 < 0.5 \qquad (2a)$$

and when $r_1 >$ Ymax, that is, when a spherical lens having the radius of curvature $r_1$ can have the effective diameter Ymax (e.g. FIG. 2-b), the lens shape $S_1(Ymax)$ at a position $y =$ Ymax satisfies.

$$-1 \times Ymax/r_1 < S_1(Ymax)/Ymax$$
$$< 0.5 \times Ymax/r_1 \qquad (2b)$$

whereby a more practical fθ lens is realized. In this case, if the shape of the lens surface adjacent to the deflection point side in the main scanning plane is convex toward the deflection point and does not satisfy expression (1), the constant speed property near the optical axis will be under-corrected, and if said shape does not satisfy expression (2a) or expression (2b), the correction of the curvature of image field in the main scanning surface will become insufficient. That is, it is the condition necessary for the fθ lens of the present invention to satisfy the performance required of an fθ lens that expression (1) and expression (2a) or (2b) be satisfied at a time.

Further, in the fθ lens of the present invention, even when a material whose refractive index is varied by an environmental fluctuation such as the fluctuation of humidity or temperature is chosen as the material of the lens, so that the influence thereof may be small, the thickness t of the lens, relative to the effective scanning width L (see FIG. 3), can be kept in a range expressed as $$0 < t/L < 0.08 \qquad (3)$$

or when the distance from the deflecting surface of the lens to the plane to be scanned is g, the thickness t can be kept in a range expressed as $$0 < t/g < 0.15 \qquad (4)$$

and the fluctuation of the imaging position by an environmental fluctuation can be kept small.

Further, the choosing the lens shape so that the shape of the lens near the optical axis may be a convex meniscus lens in at least the main scanning plane, the thickness of the lens can be kept small and yet, the thickness of the lens near the optical axis and the thickness of the lens in the effective end portion thereby can be made not to differ greatly from each other to thereby improve the homogeneity during processing and molding, and processing conditions such as distortion and processing time.

Also, by choosing the focal length fm of the lens near the optic axis in the main scanning plane relative to the distance g from the deflecting surface to the plane to be scanned so as to satisfy $$|fm|/g > 0.8 \qquad (5)$$

and by using an aspherical lens, assemblage property such as the mounting accuracy of the lens can be prevented from being remarkably aggravated. In this case, the sign of fm may be + or −.

Also, if the light beam incident on this lens is made into convergent light in at least the main scanning plane, the distance from the lens to the plane to be scanned can be shortened to thereby make the size of the entire scanning system small. In this case, when the distance from the deflection point to a point at which this convergent light is imaged in the main scanning plane is p and the distance from the deflection point to the plane to be scanned is g (see FIG. 4), design is made such that convergent light which will satisfy the condition that $$0.7 < p/g \qquad (6)$$

is caused to be incident on the lens, the aggravation of the constant speed property in the end portion of the plane to be scanned which is caused by the lens being made compact can be suppressed within a practical range. On the other hand, if this incident light beam is made into substantially parallel light in at least the main scanning plane, there will be a limit in making the lens compact, but it will become possible to alleviate the mutual mounting accuracy of the deflection point and the fθ lens.

In the fθ lens of the present invention, the lens shape is not made into an axis-symmetrical lens shape and with regard to at least one of the curved surface on the deflection point side and the curved surface on the side of the plane to be scanned, the radius of curvature near the optical axis differ between the main scanning cross-section and the sub-scanning cross-section (a cross-section perpendicular to the main scanning cross-section and containing the optical axis), whereby the curvature of image field in the sub-scanning direction (a direction perpendicular to the direction in which the light beam is scanned by an optical deflector and the direction of the optical axis) can be kept small than when the lens is constructed of only an axis-symmetrical shape.

Figure, with regard to at least one of the curved surface on the deflection point side and the curved surface on the side of the plane to be scanned, design is made such that the radius of curvature r' (see FIG. 5) of the curved surface of the lens determined in a plane containing a normal in the main scanning plane and perpendicular to the main scanning plane continuously varies in the effective portion of the lens, whereby the curvature of image field in the sub-scanning direction can be better corrected.

In this case, if in the sub-scanning cross-section about the optical axis, the deflection point and the plane to be scanned are designed so as to be in an optically conjugate relation, the inclination of the deflecting surface of the deflector can be corrected in advance.

FIG. 1 shows a first embodiment of the fθ lens according to the present invention. FIG. 1 is a cross-sectional view of the lens as it is seen in the main scanning plane. The design values of this lens are shown in Table 1, and the performance of this lens is shown in Table 2. The main scanning plane refers to a light beam surface the light beam deflected by the deflecting surface of the deflector forms with the lapse of time.

Figures 2A, 2B:
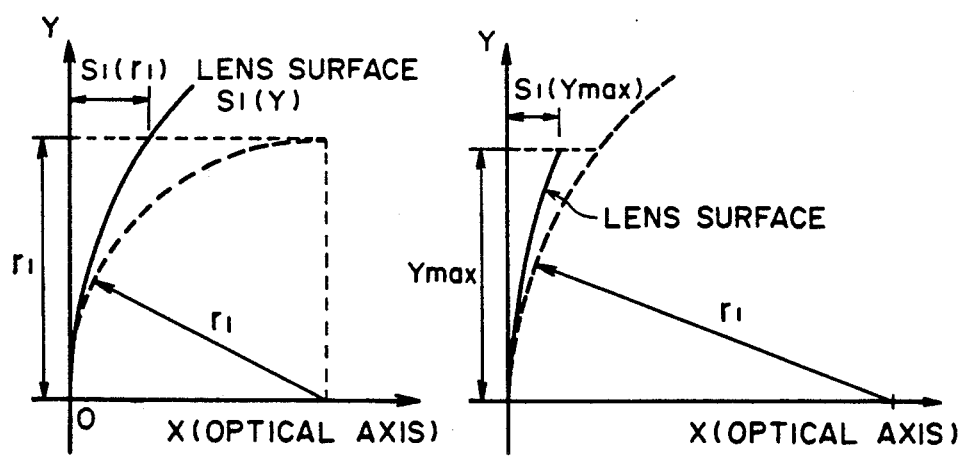
FIGS. 2A and 2B illustrate the shape of the main scanning cross-section of the surface shape of the fθ lens of the present invention which is adjacent to the deflection point side, FIG. 2A referring to a case where $r_1 <$ Ymax, and FIG. 2B referring to a case where $r_1 \geq$ Ymax.

The cross-sectional shape of this lens in the main scanning plane, when with the point of intersection between the lens surface and the optical axis as the origin, the coordinates system of the x-axis is plotted in the direction of the optic axis and the coordinates system of the y-axis is plotted in the main scanning plane perpendicularly to the direction of the optical axis, is developed into the form of a polynominal including the high-order term that $$S(y) = \frac{y^2/r_1}{1 + \sqrt{1 - (1+K)\left(\frac{y}{r_1}\right)^2}} + By^4 + Cy^6 + Dy^8 + Ey^{10},$$

where r is the radius of curvature of the lens surface in the main scanning plane near the optical axis. In this case, with regard to respective surfaces, as shown in Table 1, the cross-sectional shape of the lens surface adjacent to the deflection point of the deflecting surface is expressed as a function $S_1(y)$ in which y is a variable, the radius of curvature in the main scanning plane near the optical axis is expressed as $r_1$, the coefficients of the high order term are expressed as $k_1$, $B_1$, $C_1$, $D_1$ and $E_1$, the cross-sectional shape of the lens surface adjacent to the plane to be scanned is expressed as a function $S_2(y)$ in which y is a variable, the radius of curvature in the main scanning plane near the optical axis is expressed as $r_2$, and the coefficients of the high-order term are expressed as $k_2$, $B_2$, $C_2$, $D_2$ and $E_2$. With regard to the lens surface adjacent to the deflection point, the functions $S_1(y)$ and $r_1$ are shown in FIG. 2 with the maximum effective diameter in the main scanning plane as Ymax.

Figure 3:
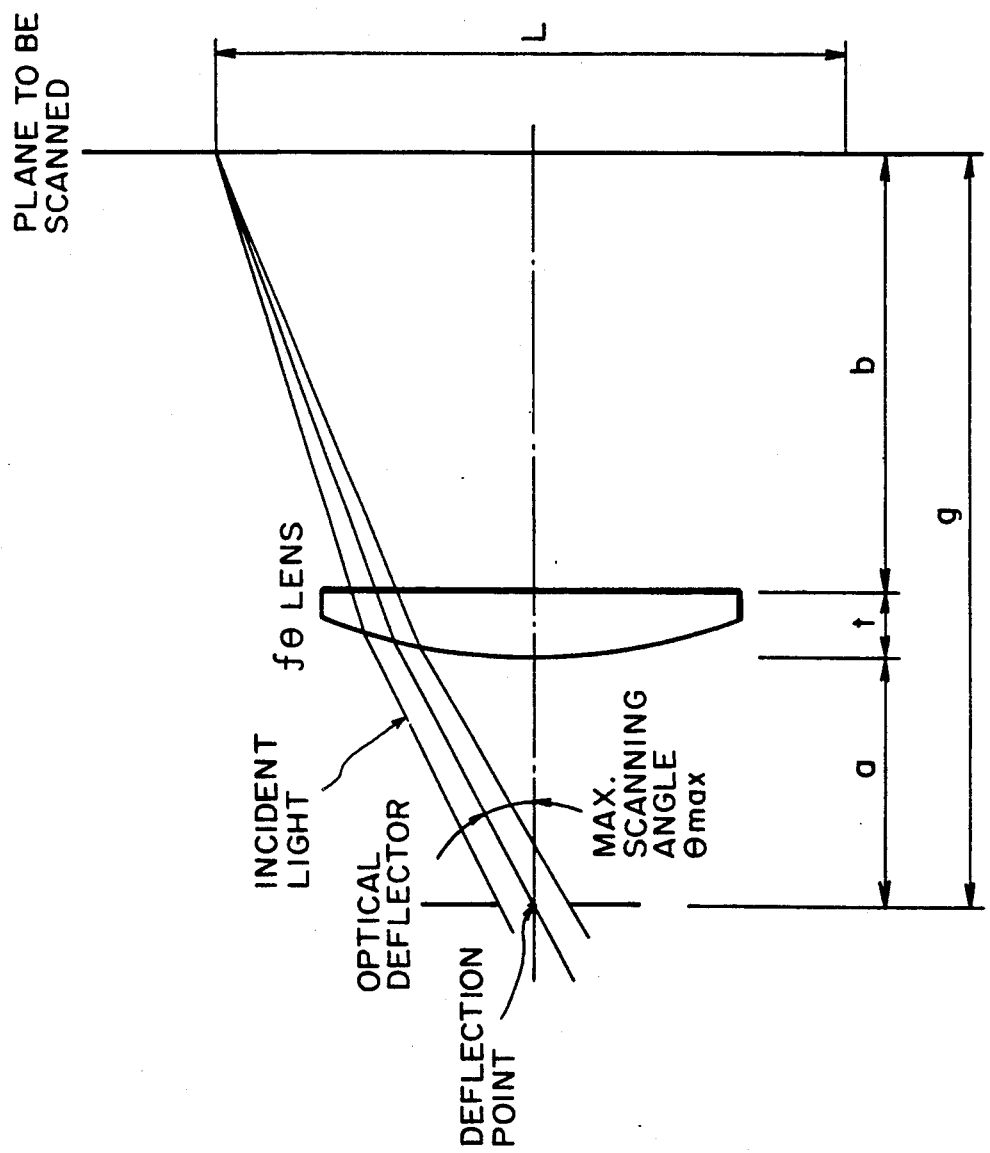
FIG. 3 illustrates the arrangement of the entire scanning system of the fθ lens of the present invention.

With regard to the arrangement of the entire scanning system, as shown in FIG. 3, the distance from the deflection point of the optical deflector to the entrance surface of the lens is a, the thickness of the lens on the optical axis is t, the distance from the exist surface of the lens to the plane to be scanned is b, the distance from the deflection point to the plane to be scanned is g, the maximum scanning angle of the lens is $\theta$max, and the effective scanning width on the plane to be scanned is L. FIG. 3 shows a cross-sectional view of the scanning system as it is seen in the main scanning plane.

Figure 4:
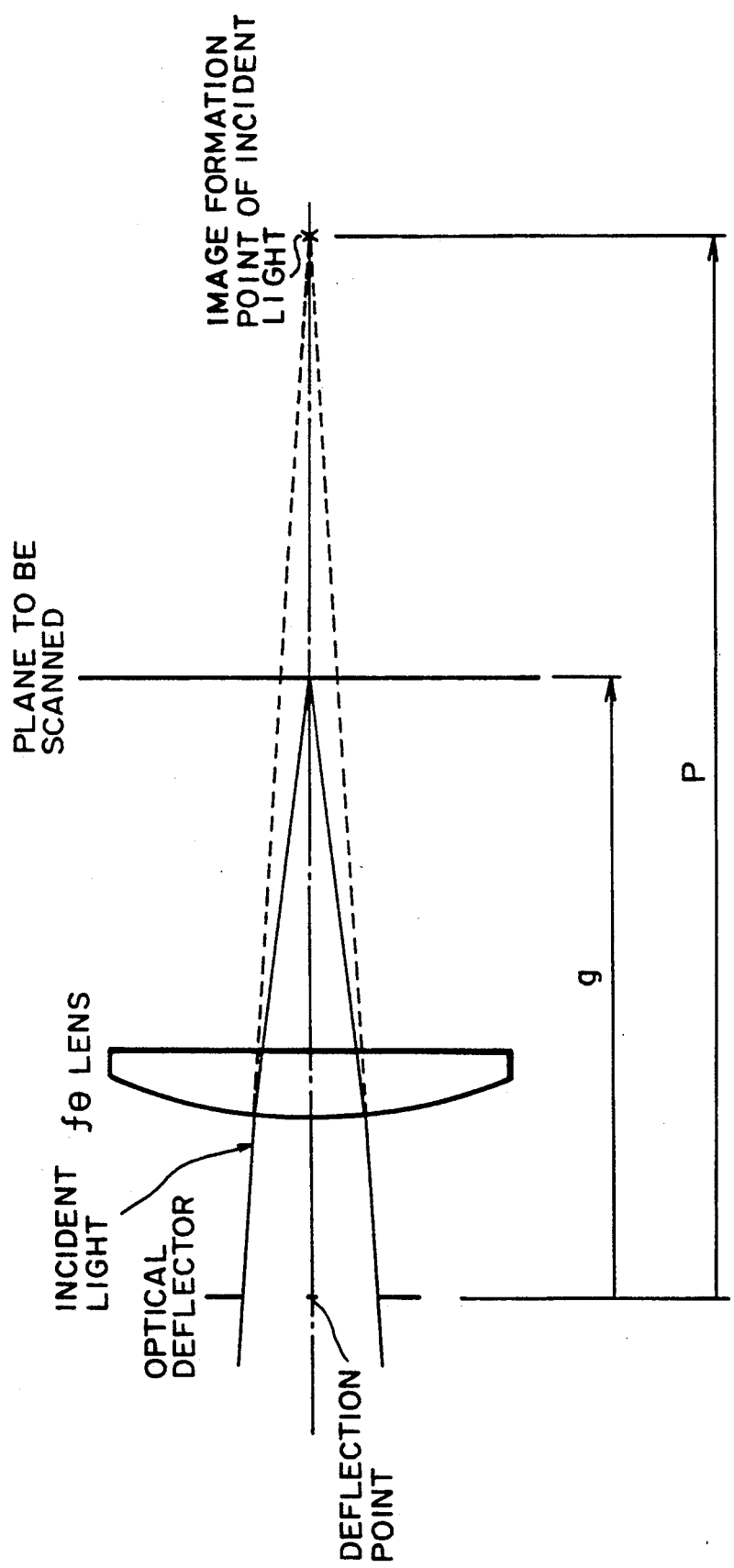
FIG. 4 illustrates the state of a light beam incident on the fθ lens of the present invention in the main scanning plane.

Also, the incident light onto the optical deflector, as shown in FIG. 4, is convergent light which is imaged at a distance p from the deflection point, in the main scanning plane. In the sub-scanning plane, the light beam emitted from a light source, not shown, passes through a cylindrical lens, not shown, and enters so as to be imaged on the deflection point of the optical deflector. In the sub-scanning plane, the lens assumes the construction of a so-called inclination correcting optical system.

Figure 5:
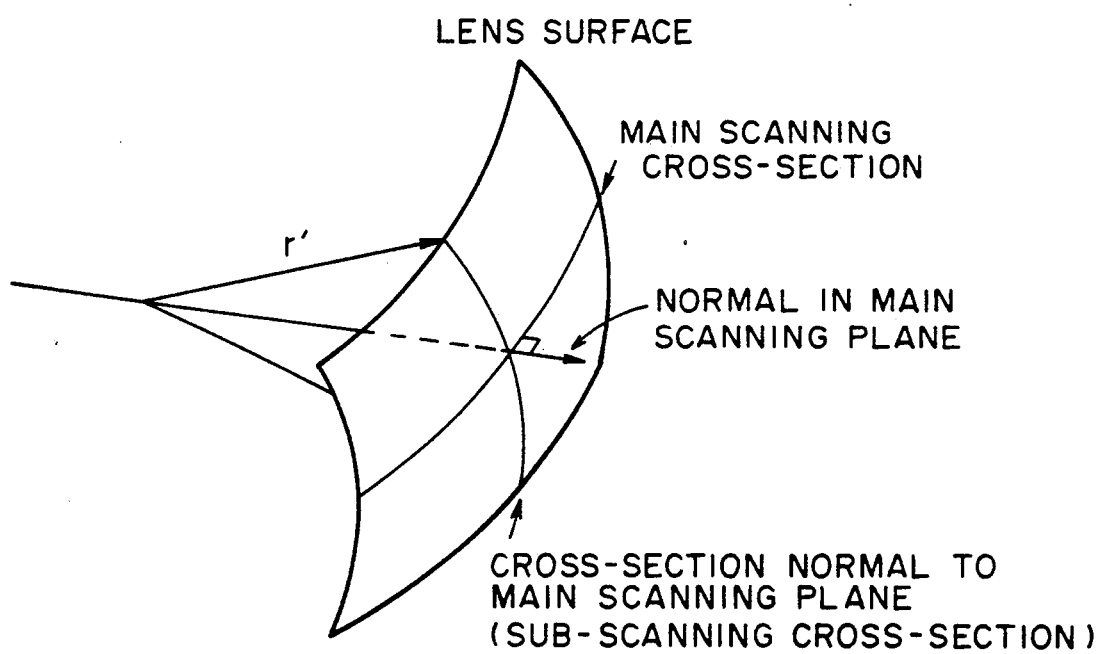
FIG. 5 illustrates the radius of curvature of the fθ lens of the present invention in the sub-scanning plane.

The shape of this lens in the sub-scanning direction, when the radius of curvature of the lens surface near the optical axis in the sub-scanning cross-section containing the optical axis is $r_s$ and as shown in FIG. 5, the z-axis is plotted in a direction containing a normal to the curved surface of the lens in the main scanning plane and perpendicular to the main scanning plane and the radius of curvature determined in a plane containing the normal and the z-axis is r' and when the position of the foot of this normal is at a position of y from the optical axis, is expressed by the use of a variable which gives a variation in radius of curvature in the form of $$S'(y) = \frac{z^2/r'}{1 + \sqrt{1 - (1+K)\left(\frac{z}{r'}\right)^2}},$$

where $r' = r_s(1 + Ay^2 + By^4 + Cy^6 + Dy^8 + Ey^{10})$. Thus, the shape of the lens in the sub-scanning direction perpendicular to the main scanning plane varies continuously in accordance with the value of y. In this case, with regard to each surface, as shown in Table 1, the lens shape of the lens surface adjacent to the deflection point in the sub-scanning plane is expressed as $S'_1(y)$, the radius of curvature in the sub-scanning plane near the optical axis is expressed as $r_1$, coefficients which give a variation in curvature are expressed $A'_1$, $B'_1$, $C'_1$ and $E'_1$, the lens shape of the lens surface adjacent to the plane to be scanned in the sub-scanning plane is expressed as $S'_2(y)$, the radius of curvature in the sub-scanning plane near the optical axis is expressed as $r_2$, and coefficients which give a variation in curvature are expressed as $A'_2$, $B'_2$, $C'_2$, $D'_2$ and $E'_2$.

In this lens, with regard to the sub-scanning cross-section of the lens, the deflection point and the sub-scanning cross-section are in a conjugate relation, thereby correcting inclination.

In the case of the first embodiment, $S'_1(y)$ is constant over the whole lens surface and $r' = \infty$.

Figure 6:
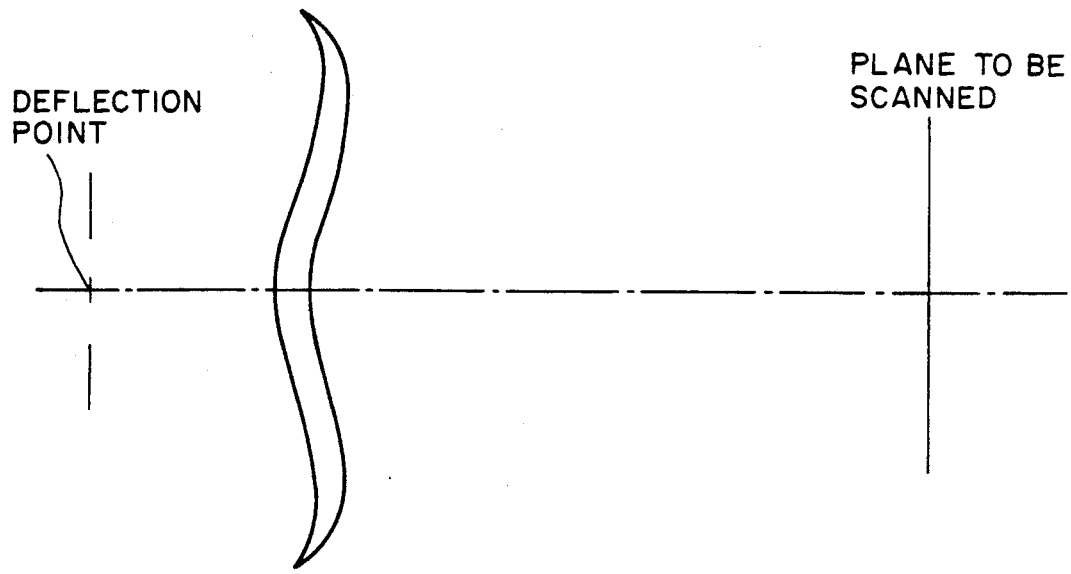
FIG. 6 is a cross-sectional view of a second embodiment of the present invention in the main scanning plane.

FIG. 6 shows a second embodiment of the $f\theta$ lens according to the present invention. FIG. 6 shows a cross-sectional view of the lens as it is seen in the main scanning plane. The design values of this lens are shown in Table 3, and the performance of this lens is shown in Table 4.

In the second embodiment, the shape of the lens in the main scanning cross-section is the same as that in the first embodiment, but the shape of the lens in the sub-scanning direction differs from that in the first embodiment. Particularly, the surface adjacent to the deflector is an aspherical surface symmetrical about the optical axis. In the other points, the shape of this lens is similar to that of the first embodiment.

Thus, the $f\theta$ lens of the present invention is wide in the degree of freedom of design with regard to the shape in the sub scanning direction.

Figure 7:
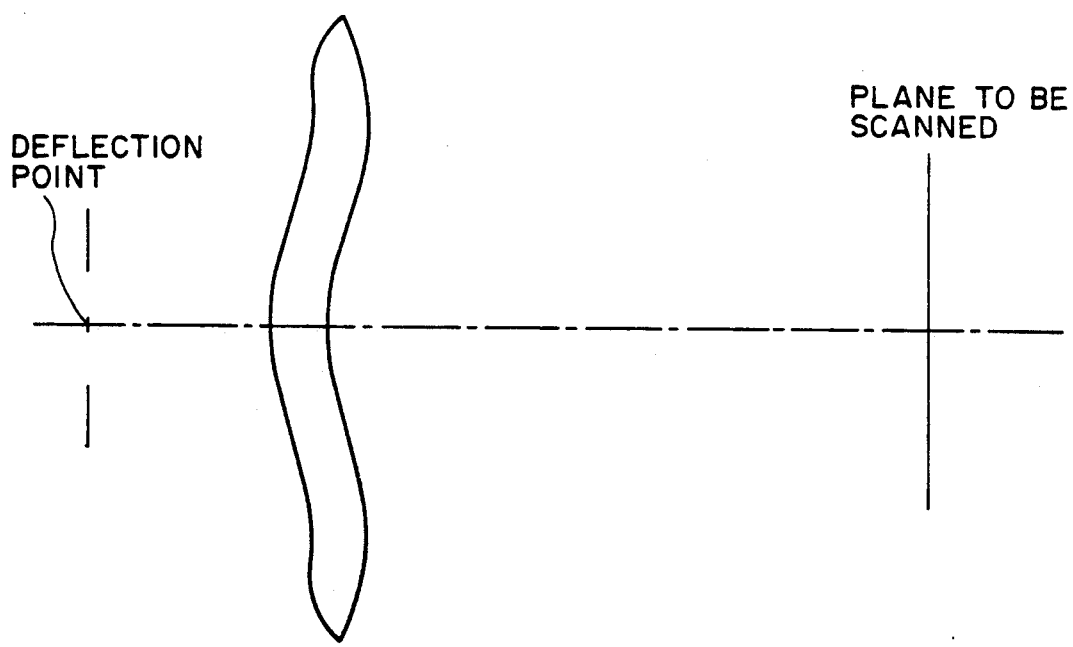
FIG. 7 is a cross-sectional view of a third embodiment of the present invention in the main scanning plane.

FIG. 7 shows a third embodiment of the $f\theta$ lens according to the present invention. FIG. 7 shows a cross-sectional view of the lens as it is seen in the main scanning plane. The design values of this lens are shown in Table 5, and the performance of this lens is shown in Table 6.

Figure 8:
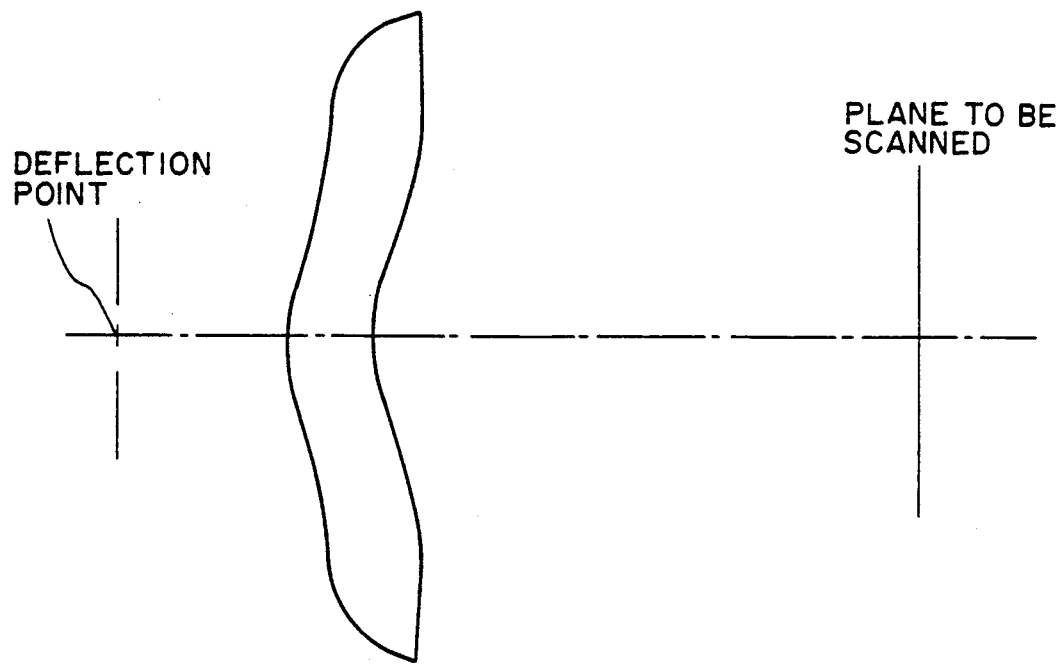
FIG. 8 is a cross-sectional view of a fourth embodiment of the present invention in the main scanning plane.

This embodiment is one in which the thickness t of the lens is made thick as compared with the first embodiment. In the extent of this embodiment, the influence of environmental fluctuations or the like poses no problem in practical use. FIG. 8 shows a fourth embodiment of the $f\theta$ lens according to the present invention. FIG. 8 shows a cross-sectional view of the lens as it is seen in the main scanning plane. The design values of this lens are shown in Table 7, and the performance of this lens is shown in Table 8.

This embodiment is one in which the lens is made further thick as compared with the third embodiment. In this case, t/L is at the utmost possible limit of the range of expression (2), while t/g is sufficiently within the range of expression (3) and therefore, the influence of environmental fluctuations becomes great, but is within a practical range.

Figure 9:
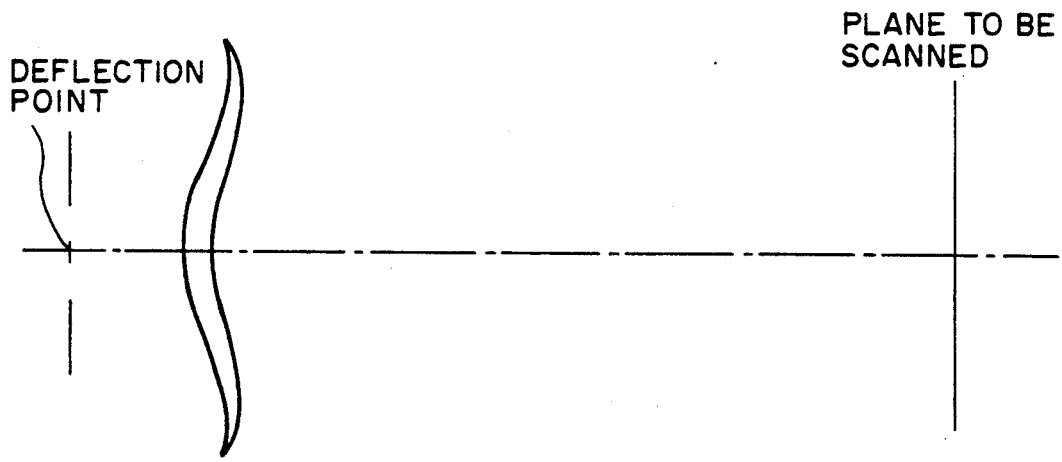
FIG. 9 is a cross-sectional view of a fifth embodiment of the present invention in the main scanning plane.

FIG. 9 shows a fifth embodiment of the $f\theta$ lens according to the present invention. FIG. 9 shows a cross-sectional view of the lens as it is seen in the main scanning plane. The design values of this lens are shown in Table 9, and the performance of this lens is shown in Table 10.

This lens is such that the incident light is parallel light in the main scanning plane, and in the sub-scanning plane, it enters so as to be imaged on the deflecting surface of the optical deflector. Therefore, the value of p is greater than in the other embodiments having the same maximum scanning angle and the same effective scanning width, but this embodiment has the advantage that aberrations will not extremely change even if the incident light beam deviates in the main scanning plane.

Figure 10:
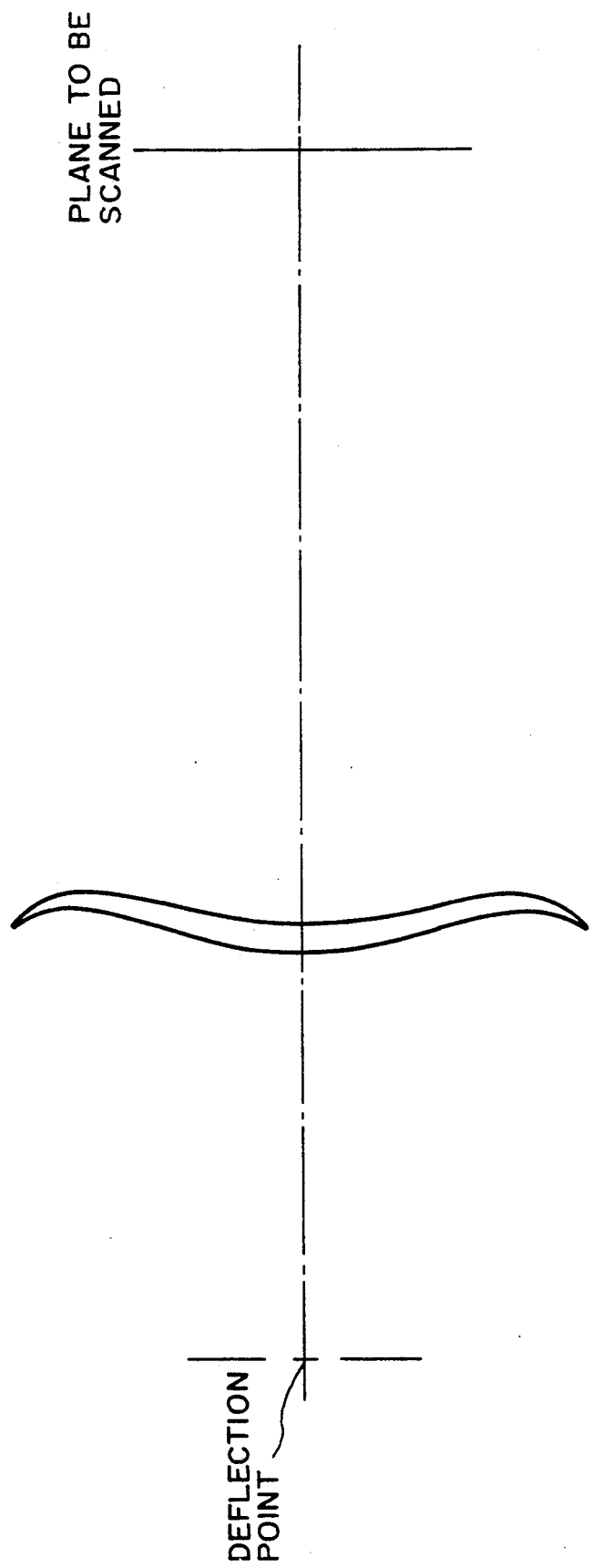
FIG. 10 is a cross-sectional view of a sixth embodiment of the present invention in the main scanning plane.

FIG. 10 shows a sixth embodiment of the $f\theta$ lens according to the present invention. FIG. 10 shows a cross-sectional view of the lens as it is seen in the main scanning plane The design values of this lens are shown in Table 11, and the performance of this lens is shown in Table 12.

This embodiment is one in which the maximum scanning angle Qmax is designed at 32°. In the case of this lens, $r_1 \geq Y_{max}$ and therefore, not $S_1(r_1)/r_1 < 0.5$ of expression (2a) but $S_1(Y_{max})/Y_{max} < 0.5 \times Y_{max}/r_1$ of expression (2b) has a meaning. Accordingly, the values of $S_1(Y_{max})$ and $0.5 \times Y_{max}/r_1$ are shown in Table 11.

Figure 11:
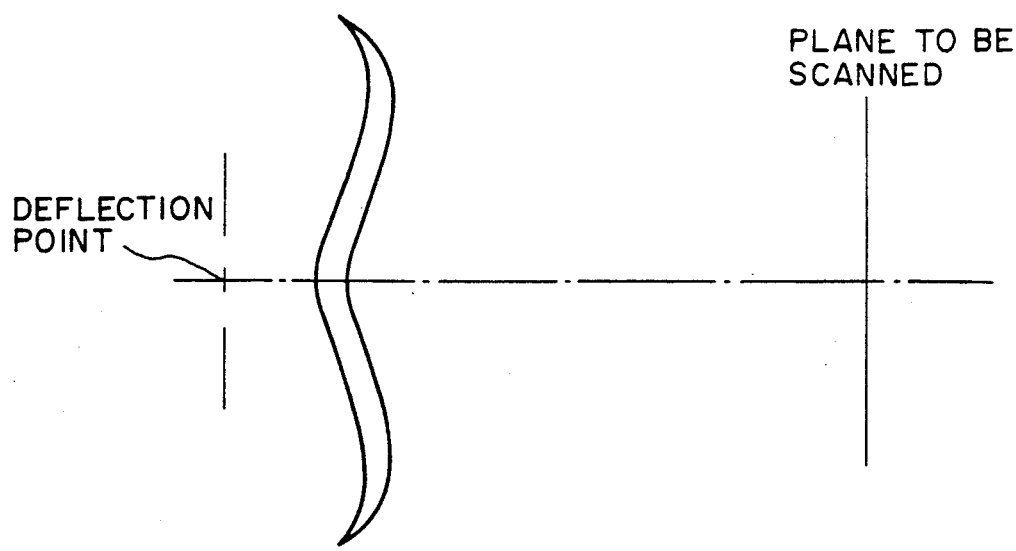
FIG. 11 is a cross-sectional view of a seventh embodiment of the present invention in the main scanning plane.

FIG. 11 shows a seventh embodiment of the $f\theta$ lens according to the present invention. FIG. 11 shows a cross-sectional view of the lens as it is seen in the main scanning plane. The design values of this lens are shown in Table 13, and the performance of this lens is shown in Table 14.

This embodiment is one in which the maximum scanning angle Qmax is designed at 56°.

Figure 12:
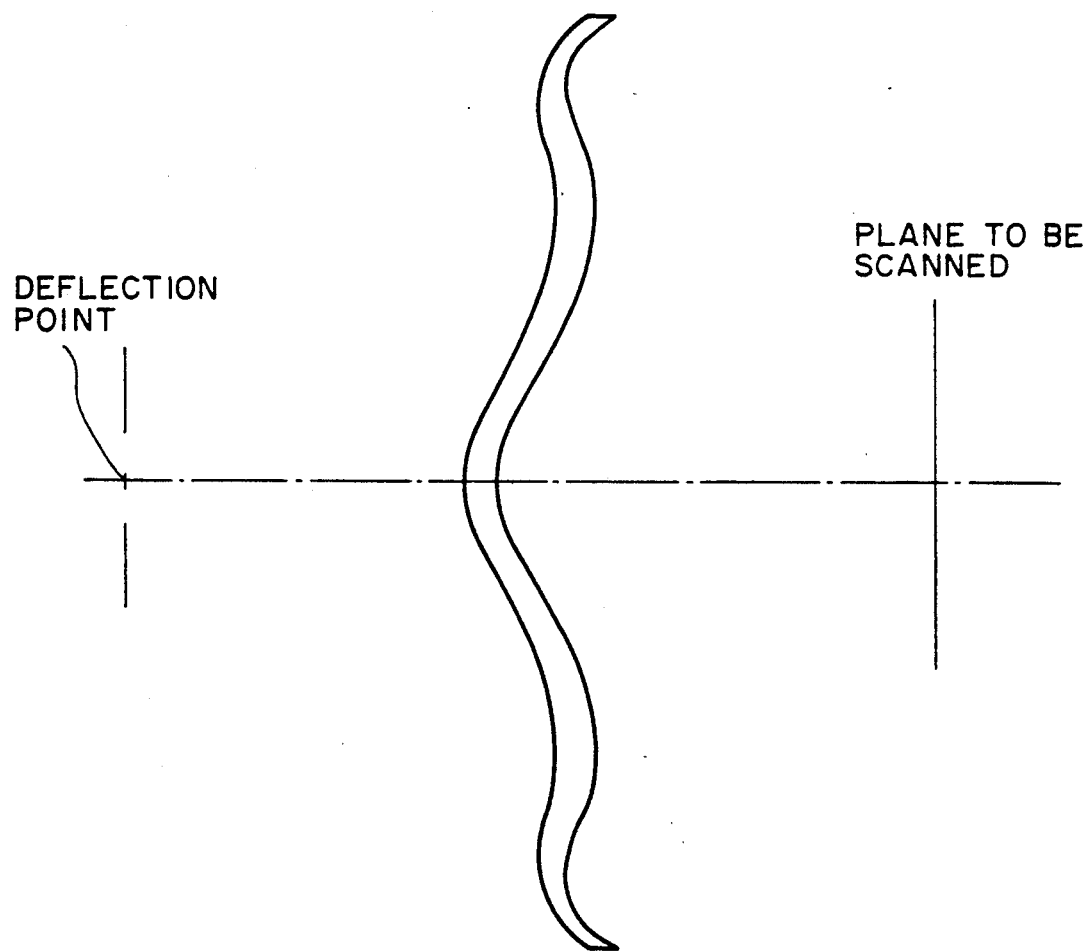
FIG. 12 is a cross-sectional view of an eighth embodiment of the present invention in the main scanning plane.
Figure 13:
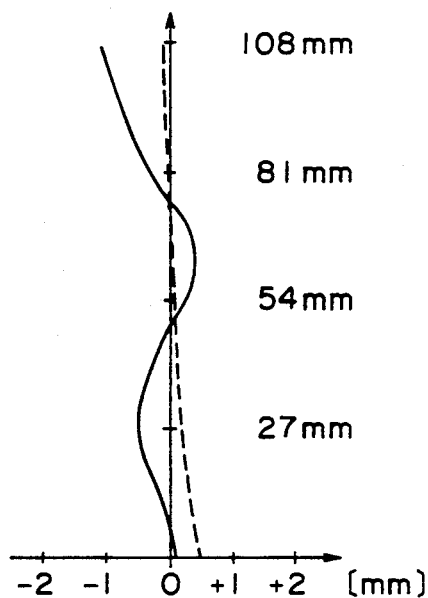
FIGS. 13 to 20 show aberrations in the embodiments of the fθ lens of the present invention.
Figure 13:
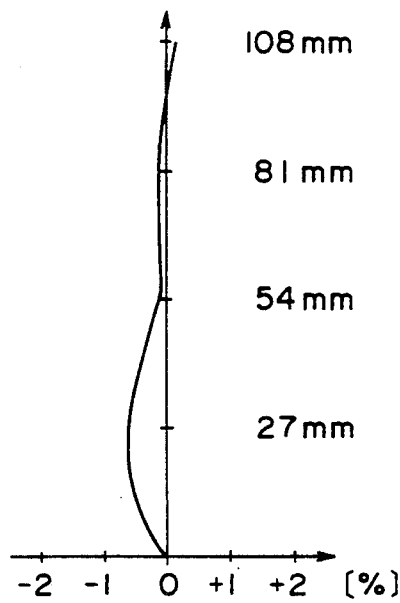
Figure 14:
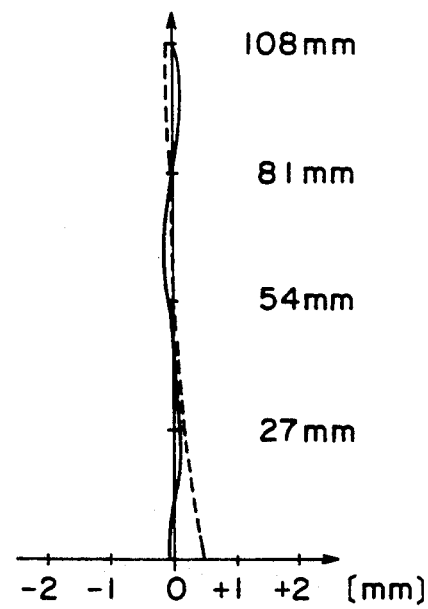
Figure 14:
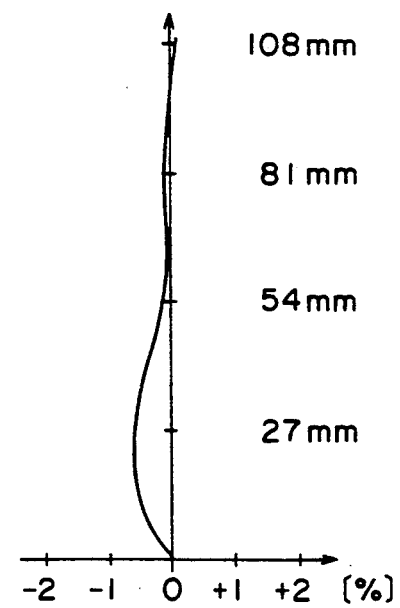
Figure 15:
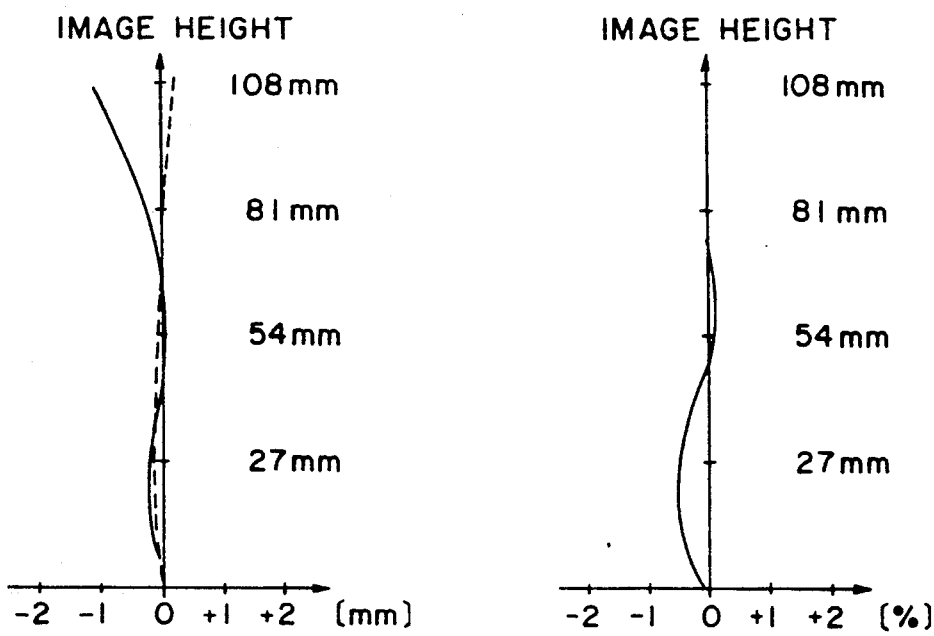
Figure 16:
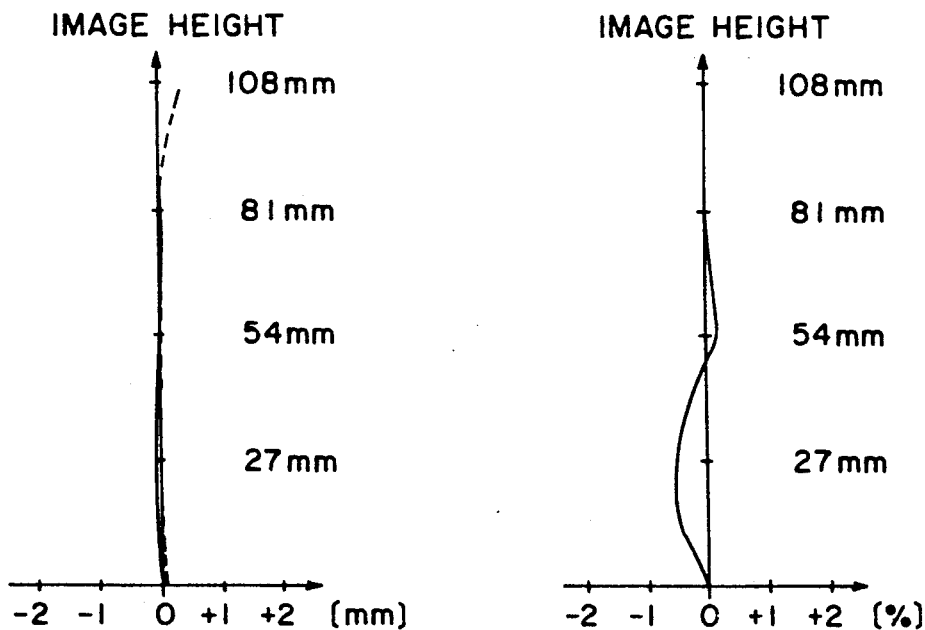
Figure 17:
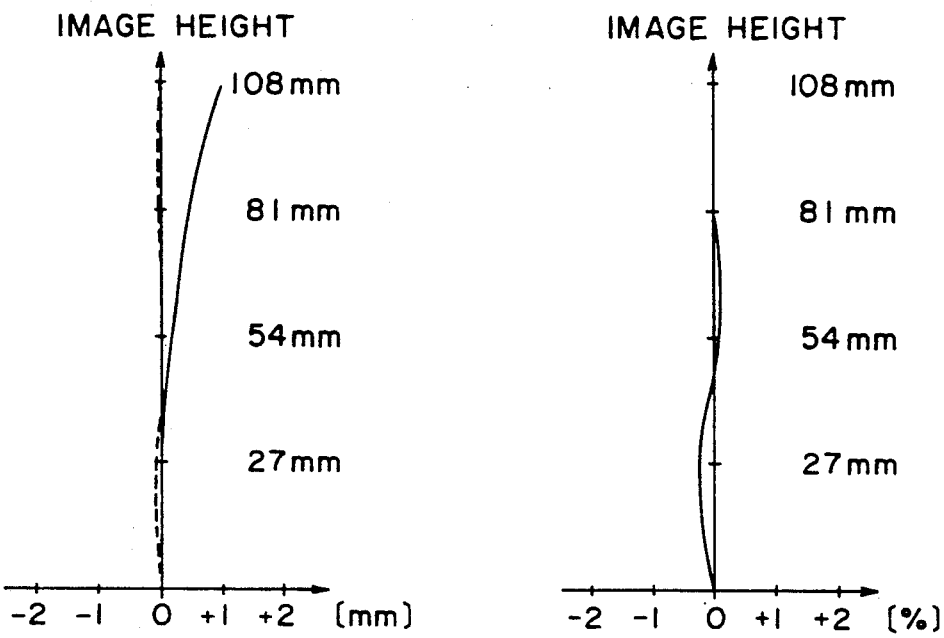
Figure 18:
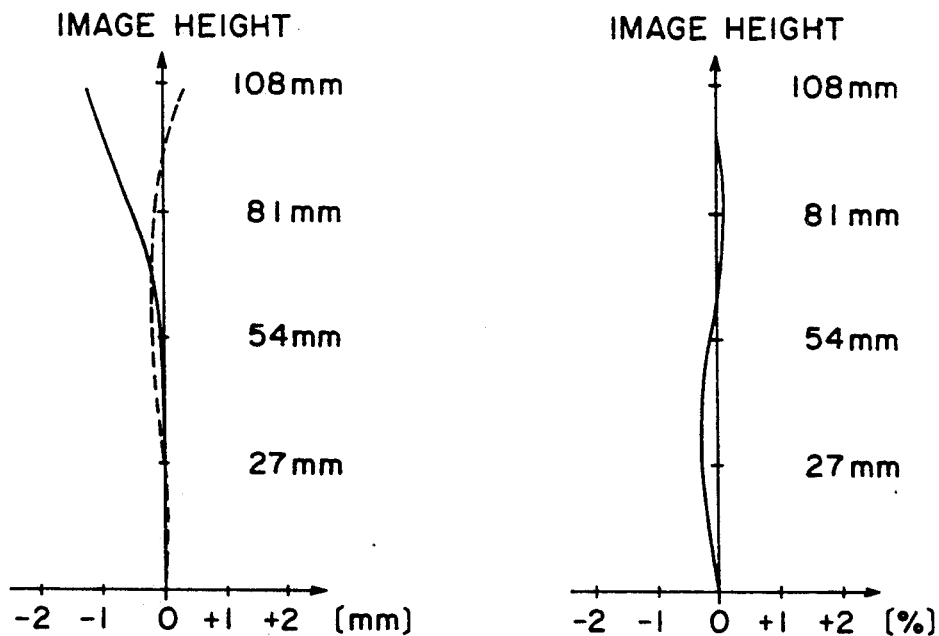
Figure 19:
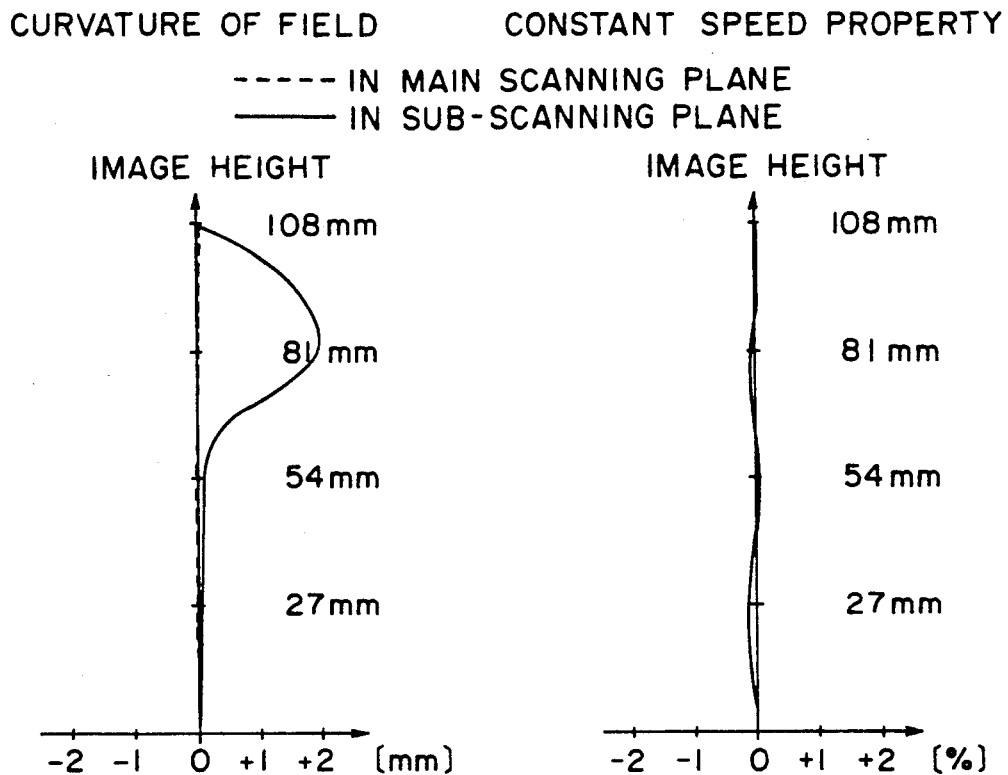
Figure 20:
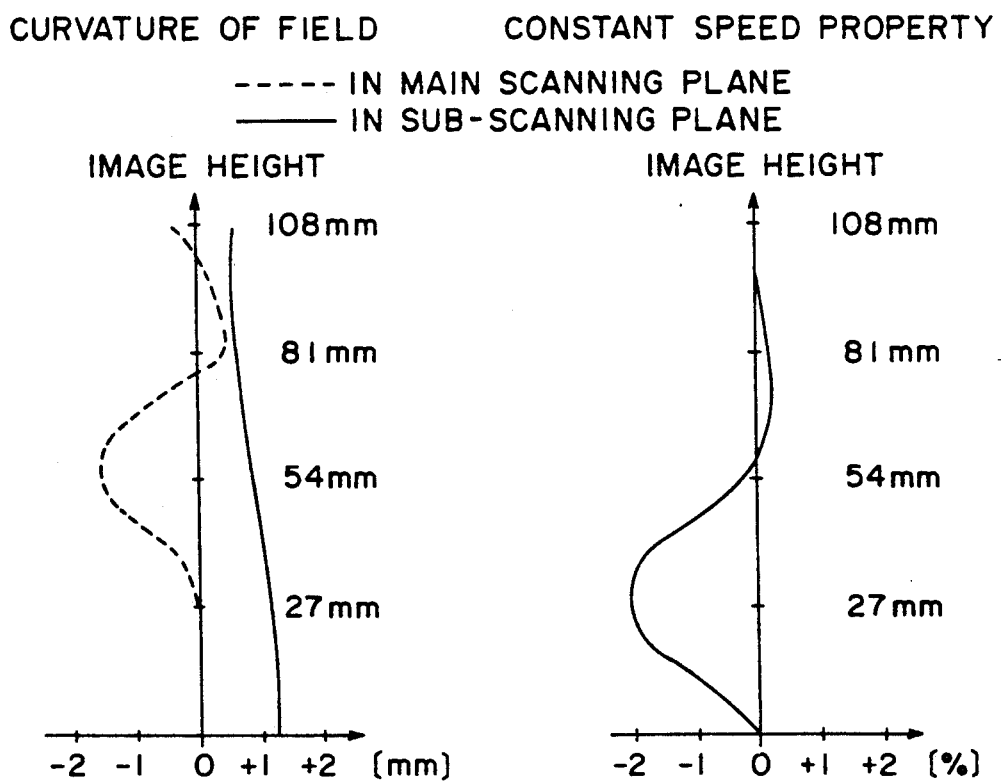

FIG. 12 shows an eighth embodiment of the $f\theta$ lens according to the present invention. FIG. 12 shows a cross-sectional view of the lens as it is seen in the main scanning plane. The design values of this lens are shown in Table 15, and the performance of this lens is shown in Table 16.

This embodiment is one in which design is made such that a becomes great as compared with the other embodiments having the same maximum scanning angle.

The tables of the design values of the embodiments of the $f\theta$ lens of the present invention will be shown below.

TABLE 1

| Wavelength used | 780 nm | Coefficients of development expression of lens surface | |
|---|---|---|---|
| Refractive index of lens | 1.57467 | Lens surface on the deflection point side | Lens surface on the side of the plane to be scanned |
| L | 216 mm | Main scanning side $S_1(y)$ | Main scanning side $S_2(y)$ |
| a | 31.64816 mm | $r_1$ 26.9119 mm | $r_2$ 28.8687 mm |
| t | 6.17434 mm | $k_1$ −4.78688 | $k_2$ −5.79781 |
| b | 108.78799 mm | $B_1$ −2.55176 E-6 | $B_2$ −3.14086 E-6 |
| g | 146.61049 mm | $C_1$ −2.88092 E-10 | $C_2$ 5.02452 E-11 |
| $\theta_{max}$ | 44° | $D_1$ 1.16473 E-13 | $D_2$ 1.78545 E-14 |
| $Y_{max}$ | 40.5 mm | $E_1$ −2.66441 E-18 | $E_2$ −3.79296 E-17 |
| $f_m$ | 321.11485 mm | Sub-scanning side $S_1'(y)$ | Sub-scanning side $S_2'(y)$ |
| p | 292.79943 mm | rs ∞ mm | rs −15.4070 mm |
| Incident light sub-scanning side | Imaged at deflection point | $A_1'$ 0 | $A_2'$ 1.95908 E-3 |
| $S_1(r_1)/r_1$ | 0.26105 | $B_1'$ 0 | $B_2'$ −3.47043 E-6 |
| t/L | 1.02858 | $C_1'$ 0 | $C_2'$ 3.04609 E-9 |
| t/g | 0.04211 | $D_1'$ 0 | $D_2'$ −8.74076 E-13 |
| $|f_m|/g$ | 2.19026 | $E_1'$ 0 | $E_2'$ −4.84512 E-17 |
| p/g | 1.99712 | | |

TABLE 2

| Incidence angle of view | Imaging position | Curvature of image field on the main scanning plane side | Curvature of image field on the sub-scanning plane side | Constant speed property |
|---|---|---|---|---|
| 0° | 0 mm | 0.42491 mm | 0.08531 mm | 0% |
| 11° | 26.82169 mm | 0.18730 mm | −0.49197 mm | −0.66041% |
| 22° | 53.93793 mm | 0.06700 mm | 0.29648 mm | −0.11494% |
| 33° | 80.91486 mm | −0.03744 mm | −0.32326 mm | −0.10511% |
| 44° | 108.09429 mm | −0.11663 mm | −1.19237 mm | 0.08731% |

TABLE 3

| Wavelength used | 780 nm | Coefficients of development expression of lens surface | |
|---|---|---|---|
| Refractive index of lens | 1.57467 | Lens surface on the deflection point side | Lens surface on the side of the plane to be scanned |
| L | 216 mm | Main scanning side | Main scanning side |

TABLE 3-continued

| | | $S_1(y)$ | | $S_2(y)$ | |
|---|---|---|---|---|---|
| a | 31.64816 mm | $r_1$ | 26.9119 mm | $r_2$ | 28.8687 mm |
| t | 6.17434 mm | $k_1$ | −4.78688 | $k_2$ | −5.79781 |
| b | 108.78799 mm | $B_1$ | −2.55176 E-6 | $B_2$ | −3.14086 E-6 |
| g | 146.61049 mm | $C_1$ | −2.88092 E-10 | $C_2$ | 5.02452 E-11 |
| $\theta_{max}$ | 44° | $D_1$ | 1.16473 E-13 | $D_2$ | 1.78545 E-14 |
| $Y_{max}$ | 40.5 mm | $E_1$ | −2.66441 E-18 | $E_2$ | −3.79296 E-17 |
| $f_m$ | 321.11485 mm | | — | Sub-scanning side $S_2'(y)$ | |
| p | 292.79943 mm | | — | rs | −30.1915 mm |
| Incident light sub-scanning side | Imaged at deflection point | | — | $A_2'$ | 9.40209 E-4 |
| $S_1(r_1)/r_1$ | 0.26105 | | — | $B_2'$ | −2.78179 E-6 |
| t/L | 0.02858 | | — | $C_2'$ | 2.97918 E-9 |
| t/g | 0.04211 | | — | $D_2'$ | −1.58547 E-12 |
| $|f_m|/g$ | 2.19026 | | — | $E_2'$ | 3.34559 E-16 |
| p/g | 1.99712 | | | | |

TABLE 4

| Incidence angle of view | Imaging position | Curvature of image field on the main scanning plane side | Curvature of image field on the sub-scanning plane side | Constant speed property |
|---|---|---|---|---|
| 0° | 0 mm | 0.42491 mm | 0.07271 mm | 0% |
| 11° | 26.82169 mm | 0.18730 mm | −0.12918 mm | −0.66041% |
| 22° | 53.93793 mm | 0.06700 mm | 0.05200 mm | −0.11494% |
| 33° | 80.91486 mm | −0.03744 mm | −1.09368 mm | −0.10511% |
| 44° | 108.09429 mm | −0.11663 mm | 0.00991 mm | 0.08731% |

TABLE 5

| Wavelength used | 780 nm | Coefficients of development expression of lens surface | | | |
|---|---|---|---|---|---|
| Refractive index of lens | 1.57467 | Lens surface on the deflection point side | | Lens surface on the side of the plane to be scanned | |
| L | 216 mm | Main scanning side $S_1(y)$ | | Main scanning side $S_2(y)$ | |
| a | 30.34728 mm | $r_1$ | 27.9359 mm | $r_2$ | 28.2013 mm |
| t | 10.00000 mm | $k_1$ | −5.12297 | $k_2$ | −5.57735 |
| b | 102.72251 mm | $B_1$ | −2.62615 E-6 | $B_2$ | −3.05805 E-6 |
| g | 143.06979 mm | $C_1$ | −2.84538 E-10 | $C_2$ | 2.67583 E-10 |
| $\theta_{max}$ | 44° | $D_1$ | 2.26473 E-13 | $D_2$ | −2.32333 E-14 |
| $Y_{max}$ | 39.2 mm | $E_1$ | −2.66441 E-18 | $E_2$ | −2.19162 E-17 |
| $f_m$ | 350.18611 mm | Sub-scanning side $S_1'(y)$ | | Sub-scanning side $S_2'(y)$ | |
| p | 292.79943 mm | rs | ∞ mm | rs | −15.5395 mm |
| Incident light sub-scanning side | Imaged at deflection point | $A_1'$ | 0 | $A_2'$ | 2.07171 E-3 |
| $S_1(r_1)/r_1$ | 0.24763 | $B_1'$ | 0 | $B_2'$ | −3.79789 E-6 |
| t/L | 0.02315 | $C_1'$ | 0 | $C_2'$ | 3.28469 E-9 |
| t/g | 0.03495 | $D_1'$ | 0 | $D_2'$ | −6.34188 E-13 |
| $|f_m|/g$ | 2.44766 | $E_1'$ | 0 | $E_2'$ | −2.01964 E-17 |
| p/g | 2.04655 | | | | |

TABLE 6

| Incidence angle of view | Imaging position | Curvature of image field on the main scanning plane side | Curvature of image field on the sub-scanning plane side | Constant speed property |
|---|---|---|---|---|
| 0° | 0 mm | 0.00681 mm | 0.03452 mm | 0% |
| 11° | 26.88949 mm | −0.11213 mm | −0.20048 mm | −0.40930% |
| 22° | 54.08625 mm | 0.02424 mm | 0.10438 mm | 0.15972% |
| 33° | 80.97892 mm | 0.05452 mm | −0.25814 mm | −0.02602% |
| 44° | 107.99877 mm | 0.27536 mm | −1.15897 mm | −0.00114% |

TABLE 7

| Wavelength used | 780 nm | Coefficients of development expression of lens surface | |
|---|---|---|---|
| Refractive index of lens | 1.57467 | Lens surface on the deflection point side | Lens surface on the side of the plane to be scanned |
| L | 216 mm | Main scanning side $S_1(y)$ | Main scanning side $S_2(y)$ |

TABLE 7-continued

| | | | | | |
|---|---|---|---|---|---|
| a | 29.44288 mm | $r_1$ | 2.95055 mm | $r_2$ | 27.6168 mm |
| t | 15.00000 mm | $k_1$ | −5.53373 | $k_2$ | −5.23709 |
| b | 94.50704 mm | $B_1$ | −2.70055 E-6 | $B_2$ | −2.83943 E-6 |
| g | 138.94992 mm | $C_1$ | −1.85714 E-10 | $C_2$ | 4.25077 E-10 |
| $\theta_{max}$ | 44° | $D_1$ | 3.09180 E-13 | $D_2$ | −1.30815 E-14 |
| $Y_{max}$ | 38.3 mm | $E_1$ | −2.42201 E-17 | $E_2$ | 9.11235 E-18 |
| $f_m$ | 395.46596 mm | Sub-scanning side $S_1'(y)$ | | Sub-scanning side $S_2'(y)$ | |
| p | 292.79943 mm | rs | ∞ mm | rs | −15.8563 mm |
| Incident light sub-scanning side | Imaged at deflection point | $A_1'$ | 0 | $A_2'$ | 2.12736 E-3 |
| $S_1(r_1)/r_1$ | 0.23120 | $B_1'$ | 0 | $B_2'$ | −3.85147 E-6 |
| t/L | 0.06944 | $C_1'$ | 0 | $C_2'$ | 3.28896 E-9 |
| t/g | 0.10795 | $D_1'$ | 0 | $D_2'$ | −6.15462 E-13 |
| $|f_m|/g$ | 2.84610 | $E_1'$ | 0 | $E_2'$ | −1.78469 E-16 |
| p/g | 2.10723 | | | | |

TABLE 8

| Incidence angle of view | Imaging position | Curvature of image field on the main scanning plane side | Curvature of image field on the sub-scanning plane side | Constant speed property |
|---|---|---|---|---|
| 0° | 0 mm | 0.01094 mm | 0.00454 mm | 0% |
| 11° | 26.86572 mm | −0.08744 mm | −0.02620 mm | −0.49733% |
| 22° | 54.10123 mm | 0.06297 mm | 0.01514 mm | −0.18746% |
| 33° | 80.97640 mm | 0.03416 mm | −0.02887 mm | −0.02914% |
| 44° | 108.00456 mm | 0.32891 mm | −0.11629 mm | 0.00422% |

TABLE 9

| Wavelength used | 780 nm | Coefficients of development expression of lens surface | | | |
|---|---|---|---|---|---|
| Refractive index of lens | 1.57467 | Lens surface on the deflection point side | | Lens surface on the side of the plane to be scanned | |
| L | 216 mm | Main scanning side $S_1(y)$ | | Main scanning side $S_2(y)$ | |
| a | 19.61717 mm | $r_1$ | 22.0311 mm | $r_2$ | 27.9182 mm |
| t | 5.00000 mm | $k_1$ | −6.70387 | $k_2$ | −10.4291 |
| b | 128.49907 mm | $B_1$ | −3.29505 E-7 | $B_2$ | −2.29333 E-6 |
| g | 153.11624 mm | $C_1$ | −2.46699 E-9 | $C_2$ | 5.95537 E-10 |
| $\theta_{max}$ | 44° | $D_1$ | 1.46251 E-13 | $D_2$ | 6.16143 E-13 |
| $Y_{max}$ | 27.9 mm | $E_1$ | 1.37547 E-17 | $E_2$ | −7.14808 E-16 |
| $f_m$ | 140.10521 mm | Sub-scanning side $S_1'(y)$ | | Sub-scanning side $S_2'(y)$ | |
| p | ∞ mm | rs | ∞ mm | rs | −11.1244 mm |
| Incident light sub-scanning side | Imaged at deflection point | $A_1'$ | 0 | $A_2'$ | 3.59219 E-3 |
| $S_1(r_1)/r_1$ | 0.26972 | $B_1'$ | 0 | $B_2'$ | −1.08695 E-5 |
| t/L | 0.02315 | $C_1'$ | 0 | $C_2'$ | 2.09015 E-8 |
| t/g | 0.03265 | $D_1'$ | 0 | $D_2'$ | −4.08754 E-13 |
| $|f_m|/g$ | 0.91503 | $E_1'$ | 0 | $E_2'$ | −1.98562 E-14 |
| p/g | ∞ | | | | |

TABLE 10

| Incidence angle of view | Imaging position | Curvature of image field on the main scanning plane side | Curvature of image field on the sub-scanning plane side | Constant speed property |
|---|---|---|---|---|
| 0° | 0 mm | 0.00188 mm | −0.03561 mm | 0% |
| 11° | 26.92541 mm | −0.02322 mm | 0.01809 mm | −0.27626% |
| 22° | 54.06152 mm | 0.01473 mm | 0.17296 mm | 0.11393% |
| 33° | 80.98224 mm | −0.00237 mm | 0.43728 mm | −0.02193% |
| 44° | 107.99953 mm | −0.02902 mm | 1.03899 mm | −0.00044% |

TABLE 5

| Wavelength used | 780 nm | Coefficients of development expression of lens surface | | | |
|---|---|---|---|---|---|
| Refractive index of lens | 1.57467 | Lens surface on the deflection point side | | Lens surface on the side of the plane to be scanned | |
| L | 216 mm | Main scanning side $S_1(y)$ | | Main scanning side $S_2(y)$ | |
| a | 71.08404 mm | $r_1$ | 60.0000 mm | $r_2$ | 73.3174 mm |

TABLE 5-continued

| | | | | | |
|---|---|---|---|---|---|
| t | 5.00000 mm | $k_1$ | −3.87781 | $k_2$ | −4.34297 |
| b | 136.16557 mm | $B_1$ | −1.84687 E-7 | $B_2$ | −6.74641 E-7 |
| g | 212.24962 mm | $C_1$ | −8.95896 E-10 | $C_2$ | −7.69111 E-10 |
| $\theta_{max}$ | 32° | $D_1$ | 2.06800 E-13 | $D_2$ | 2.34907 E-13 |
| $Y_{max}$ | 48.9 mm | $E_1$ | −3.01247 E-17 | $E_2$ | −5.42806 E-17 |
| $f_m$ | 505.53622 mm | | Sub-scanning side $S_1'(y)$ | | Sub-scanning side $S_2'(y)$ |
| p | 274.92354 mm | rs | ∞ mm | rs | −27.6158 mm |
| Incident light sub-scanning side | Imaged at deflection point | $A_1'$ | 0 | $A_2'$ | 3.43802 E-4 |
| $S_1(Y_{max})/Y_{max}$ | 0.23093 | $B_1'$ | 0 | $B_2'$ | −1.61819 E-7 |
| $0.5 \times Y_{max}/r_1$ | 0.40750 | $C_1'$ | 0 | $C_2'$ | −3.50099 E-11 |
| t/L | 0.02315 | $D_1'$ | 0 | $D_2'$ | 3.10358 E-14 |
| t/g | 0.02356 | $E_1'$ | 0 | $E_2'$ | −3.04885 E-18 |
| $|f_m|/g$ | 2.38180 | | | | |
| p/g | 1.29232 | | | | |

TABLE 12

| Incidence angle of view | Imaging position | Curvature of image field on the main scanning plane side | Curvature of image field on the sub-scanning plane side | Constant speed property |
|---|---|---|---|---|
| 0° | 0 mm | 0.00464 mm | 0.01597 mm | 0% |
| 8° | 26.92064 mm | 0.03678 mm | −0.02679 mm | −0.29393% |
| 16° | 53.93273 mm | −0.13788 mm | −0.05082 mm | −0.12457% |
| 24° | 81.05539 mm | −0.14220 mm | −0.52391 mm | 0.06738% |
| 32° | 108.00432 mm | 0.27305 mm | −1.18613 mm | 0.00400% |

TABLE 13

| Wavelength used | 780 nm | Coefficients of development expression of lens surface | | | |
|---|---|---|---|---|---|
| Refractive index of lens | 1.57467 | Lens surface on the deflection point side | | Lens surface on the side of the plane to be scanned | |
| L | 216 mm | Main scanning side $S_1(y)$ | | Main scanning side $S_2(y)$ | |
| a | 15.05054 mm | $r_1$ | 8.94552 mm | $r_2$ | 7.71858 mm |
| t | 5.00000 mm | $k_1$ | −7.63139 | $k_2$ | −7.68973 |
| b | 86.93520 mm | $B_1$ | −9.78039 E-7 | $B_2$ | −4.97108 E-6 |
| g | 106.98574 mm | $C_1$ | −3.09809 E-9 | $C_2$ | 2.73858 E-9 |
| $\theta_{max}$ | 56° | $D_1$ | 1.79254 E-12 | $D_2$ | −1.17732 E-12 |
| $Y_{max}$ | 36.4 mm | $E_1$ | −4.3266 E-16 | $E_2$ | −4.13303 E-17 |
| $f_m$ | 200.99035 mm | | Sub-scanning side $S_1'(y)$ | | Sub-scanning side $S_2'(y)$ |
| p | 319.47862 mm | rs | 25.0783 mm | rs | −11.5520 mm |
| Incident light sub-scanning side | Imaged at deflection point | $A_1'$ | 0 | $A_2'$ | 1.59426 E-2 |
| $S_1(r_1)/r_1$ | 0.26884 | $B_1'$ | 0 | $B_2'$ | −7.46233 E-5 |
| t/L | 0.02315 | $C_1'$ | 0 | $C_2'$ | 1.45733 E-7 |
| t/g | 0.04674 | $D_1'$ | 0 | $D_2'$ | 3.30509 E-11 |
| $|f_m|/g$ | 1.87866 | $E_1'$ | 0 | $E_2'$ | −7.56819 E-14 |
| p/g | 2.98618 | | | | |

TABLE 14

| Incidence angle of view | Imaging position | Curvature of image field on the main scanning plane side | Curvature of image field on the sub-scanning plane side | Constant speed property |
|---|---|---|---|---|
| 0° | 0 mm | −0.00296 mm | −0.01150 mm | 0% |
| 14° | 26.96683 mm | −0.00101 mm | 0.03840 mm | −0.12285% |
| 28° | 54.01959 mm | −0.00210 mm | 0.08025 mm | 0.03628% |
| 42° | 80.99798 mm | −0.00235 mm | 1.98343 mm | −0.00249% |
| 56° | 108.00401 mm | 0.03719 mm | −0.12910 mm | 0.00371% |

TABLE 15

| Wavelength used | 780 nm | Coefficients of development expression of lens surface | | | |
|---|---|---|---|---|---|
| Refractive index of lens | 1.57467 | Lens surface on the deflection point side | | Lens surface on the side of the plane to be scanned | |
| L | 216 mm | Main scanning side $S_1(y)$ | | Main scanning side $S_2(y)$ | |
| a | 56.31337 mm | $r_1$ | 17.1466 mm | $r_2$ | 14.9427 mm |

TABLE 15-continued

| | | | | | |
|---|---|---|---|---|---|
| t | 5.00000 mm | $k_1$ | −3.08642 | $k_2$ | −2.96849 |
| b | 72.65824 mm | $B_1$ | −1.06905 E-6 | $B_2$ | −1.19000 E-6 |
| g | 133.97362 mm | $C_1$ | −1.11624 E-9 | $C_2$ | −8.41386 E-10 |
| $\theta_{max}$ | 44° | $D_1$ | 3.67839 E-13 | $D_2$ | 2.40892 E-13 |
| $Y_{max}$ | 70.4 mm | $E_1$ | −2.83506 E-17 | $E_2$ | −1.43905 E-17 |
| $f_m$ | −1175.861993 mm | Sub-scanning side $S_1'(y)$ | | Sub-scanning side $S_2'(y)$ | |
| p | 145.00000 mm | rs | ∞ mm | rs | −18.9369 mm |
| Incident light sub-scanning side | Imaged at deflection point | $A_1'$ | 0 | $A_2'$ | 1.8769 E-3 |
| $S_1(r_1)/r_1$ | 0.35574 | $B_1'$ | 0 | $B_2'$ | −2.21157 E-6 |
| t/L | 0.02315 | $C_1'$ | 0 | $C_2'$ | 6.54907 E-10 |
| t/g | 0.03732 | $D_1'$ | 0 | $D_2'$ | 2.70727 E-14 |
| $|f_m|/g$ | 8.77682 | $E_1'$ | 0 | $E_2'$ | −1.74730 E-17 |
| p/g | 1.08230 | | | | |

TABLE 16

| Incidence angle of view | Imaging position | Curvature of image field on the main scanning plane side | Curvature of image field on the sub-scanning plane side | Constant speed property |
|---|---|---|---|---|
| 0° | 0 mm | 0.02100 mm | 1.21237 mm | 0% |
| 11° | 26.44729 mm | −0.06439 mm | 1.09819 mm | −2.04707% |
| 22° | 53.92038 mm | −1.50412 mm | 0.83558 mm | −0.14744% |
| 33° | 81.15944 mm | 0.47430 mm | 0.58732 mm | 0.19684% |
| 44° | 107.99872 mm | −0.35419 mm | 0.55777 mm | −0.00119% |

FIGS. 13 to 20 show aberrations in the embodiments of the fθ lens of the present invention.

Description will now be made of an image forming apparatus using an optical scanning device to form an image on an image carrier.

Figure 21:
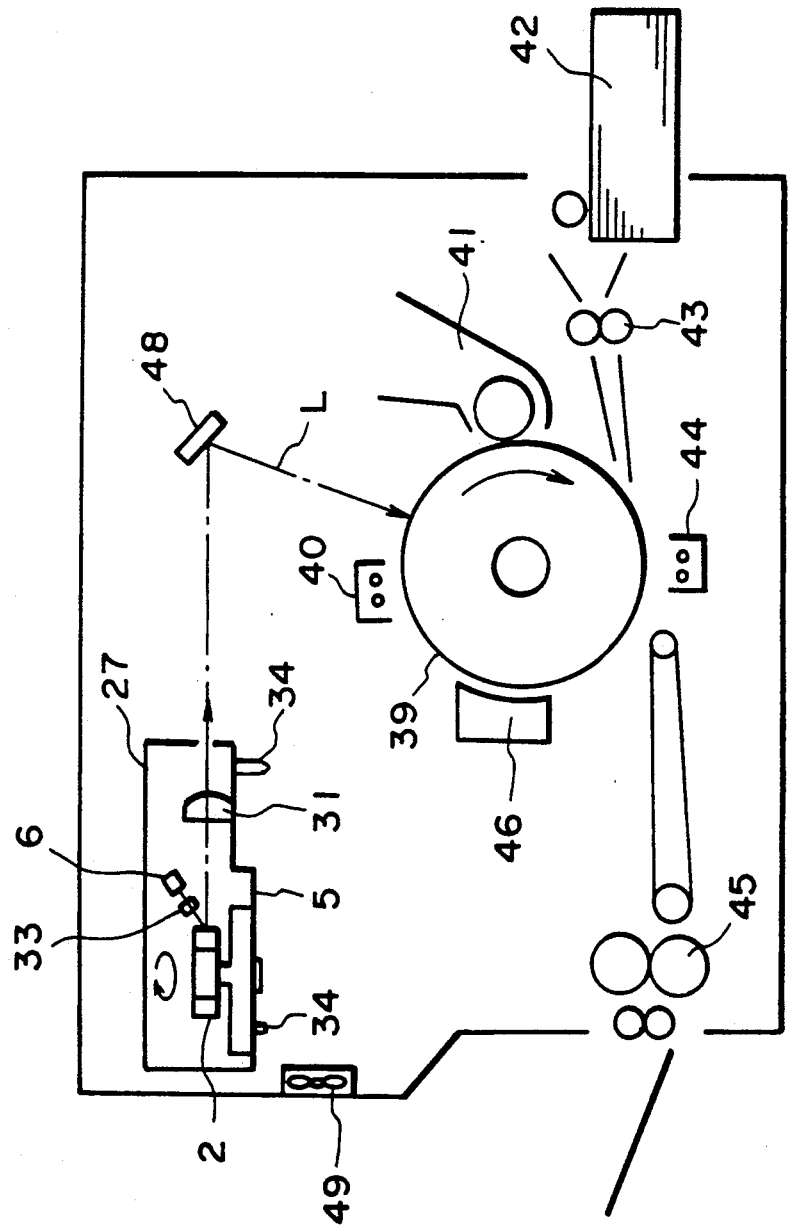
FIG. 21 is a cross-sectional view of an image forming apparatus using the fθ lens of the present invention.

FIG. 21 is a cross-sectional view of a laser beam printer which is an image forming apparatus for recording images by a laser beam to which the fθ lens of the present invention is applied.

Description will hereinafter be made of FIG. 21.

In FIG. 21, the reference numeral 39 designates a photosensitive drum rotated in the direction of arrow. Around the photosensitive drum 39, there are provided in succession a charger 40 for uniformly charging the surface of the drum, a developing device 41 for developing a latent image on the photosensitive drum, a transfer charger 44 for transferring the image developed by the developing device 41 to paper, and a cleaner 46 for removing any unnecessary developer remaining on the surface of the photosensitive drum after the image transfer.

The reference numeral 42 denotes a paper supply cassette containing recording paper therein, the reference numeral 43 designates register rollers, and the reference numeral 45 denotes a fixating device for making the transferred image semipermanent. The reference numeral 49 designates a fan for forming an air stream on the underside of a housing to thereby prevent the temperature rise of an optical system. A semiconductor laser output portion 6 contained in a containing portion formed integrally with a base plate 5 outputs a laser beam optically modulated by an extraneous signal in conformity with recording information, and this laser beam emerges from a housing comprised of the base plate 5 and a cover member 27 through a cylindrical lens 33 highly accurately held and positioned by a supporting portion formed integrally with the base plate 5 and the containing portion, a rotatable polygon mirror 2 for deflecting the light beam at a uniform angular velocity, and an fθ lens 31, and scans on the photosensitive drum 39 via a mirror 48, whereby a charge pattern conforming to the recording information is formed on the photosensitive drum 39.

The reference numeral 34 denotes a positioning member for the housing provided on the underside of the base plate 5 integrally with the base plate, and positioned highly accurately with the photosensitive drum 39 and the mirror 48. Positioning accuracy is enhanced by this positioning member, whereby the positional accuracy relative to the photosensitive drum is enhanced and therefore, it becomes possible to obtain more excellent images.

The charge pattern on the drum is visualized by the developing device 41. This visualized image is transferred by the transfer charger 44 onto the recording paper fed from the paper supply cassette 42, whereafter the recording paper is fed to the fixating device 45 for fixation of the image. Any developer remaining on the photosensitive drum after the image transfer is removed by the cleaner 46 and prepared for another use.

Such an image forming apparatus to which the fθ lens of the present invention is applied can be made compact and thin.

As described above, according to the present invention, there can be realized an fθ lens comprising a single lens in which the shape of the curved surface of at least the lens surface on the deflection point side in the main scanning plane is an aspherical shape and particularly near the optical axis, this aspherical shape becomes convex toward the deflection point side and further, the shape of this surface in the main scanning plane is made to satisfy expressions (1) and (2-a) or (2-b), whereby the fθ lens satisfies the performance required of an fθ lens and yet the thickness of the lens is kept small so as to be suitable for plasticization. Also, the use of such fθ lens can realize an image forming apparatus which can be made compact and thin.

I claim:

1. An fθ lens acting to effect uniform speed scanning while causing a light beam deflected at a uniform angular velocity by the deflecting surface of a deflector to be imaged on a plane to be scanned, wherein the shape of the curved surface of at least the lens surface of the lens which is adjacent to the deflection point side of the deflecting surface in the main scanning plane is an aspherical shape and particularly, near the optical axis, in at least the main scanning plane, this aspherical shape is convex toward said deflection point, and when the radius of curvature of this convex shape near the optical axis in the main scanning plane is $r_1$ and the focal length of the $f\theta$ lens near the optical axis in the main scanning plane is fm, $$0 \leq r_1 < |fm|$$

and yet, when with the point of intersection between the lens surface adjacent to the deflection point side and the optical axis as the origin and with the coordinates system of the x-axis plotted in the direction of the optical axis and the coordinates system of the y-axis plotted in the main scanning plane perpendicularly thereto, the surface shape in the main scanning plane is expressed as a function $S_1(y)$ in which y is a variable, and when the maximum effective diameter of this surface in the main scanning plane is Ymax, $S_1(y)$ is defined between 0 and Ymax, and when $r_1 < Ymax$, $$-1 < S_1(r_1)/r_1 < 0.5$$

and when $r_1 \geq Ymax$, $$-1 \times Ymax/r_1 < S_1(Ymax)/Ymax < 0.5 \times Ymax/r_1.$$

2. An $f\theta$ lens according to claim 1, wherein when the thickness of the $f\theta$ lens on the optical axis thereof is t and the effective scanning width on the plane to be scanned is L, $$0 < t/L < 0.08.$$

3. An $f\theta$ lens according to claim 1, wherein when the thickness of the $f\theta$ lens on the optical axis thereof is t and the distance from the deflection point of the deflecting surface to the plane to be scanned is g, $$0 < t/g < 0.15$$

4. An $f\theta$ lens according to claim 1, wherein the focal length fm near the optical axis in the main scanning plane and the distance g from the deflection point of the deflecting surface to the plane to be scanned are $$|fm|/g > 0.8$$

5. An $f\theta$ lens according to claim 1, wherein the shape of the lens near the optical axis is a meniscus lens convex toward the deflection point side of the deflecting surface in at least the main scanning plane.

6. An $f\theta$ lens according to claim 1, wherein the light beam incident on the lens is substantially convergent light in at least the main scanning plane.

7. An $f\theta$ lens according to claim 6, wherein the light beam incident on the lens is substantially convergent light in at least the main scanning plane, and the distance p from the deflection point of the deflecting surface to a point at which the convergent light is imaged in the main scanning plane and the distance g from the deflection point of the deflecting surface to the plane to be scanned are $$0.7 < p/g.$$

8. An $f\theta$ lens according to claim 1, wherein the light beam incident on the lens is substantially parallel light in at least the main scanning plane.

9. An $f\theta$ lens according to claim 1, wherein with regard to at least one of a curved surface adjacent to the deflection point and a curved surface adjacent to the plane to be scanned, the radius of curvature near the optical axis differs between the main scanning cross-section and the sub-scanning cross-section (a plane containing the optical axis of the lens and perpendicular to the main scanning plane).

10. An $f\theta$ lens according to claim 9, wherein with regard to at least one of a curved surface adjacent to the deflection point and a curved surface adjacent to the plane to be scanned, the radius of curvature of the curved surface of the lens determined in a plane containing a normal in the main scanning plane and perpendicular to the main scanning plane varies continuously in the effective portion of the lens.

11. An $f\theta$ lens according to claim 9 or 10, wherein in the sub-scanning cross-section near the optical axis, the deflection point and the plane to be scanned are in an optically substantially conjugate relation.

12. A scanning optical system comprising a light source, a first optical system for condensing light from the light source and causing the light to emerge toward the deflection point of the deflecting surface of a deflector, a deflector for deflecting the light beam from the first optical system at a uniform angular velocity on the deflection point of the deflecting surface thereof, a second optical system comprising an $f\theta$ lens acting to effect uniform speed scanning while causing the light beam deflected at a uniform angular velocity from the deflection point of the deflector to be imaged on a plane to be scanned, and a plane to be scanned on which a recording material such as a photosensitive member is placed, characterized in that the shape of the curved surface in the main scanning plane of at least the lens surface of the $f\theta$ lens of the second optical system which is adjacent to the deflection point is an aspherical shape and particularly near the optical axis, in at least the main scanning plane, this aspherical shape is convex toward the deflection point, and when the radius of curvature of this convex shape near the optical axis in the main scanning plane is $r_1$ and the focal length of said $f\theta$ lens near the optical axis in the main scanning plane is fm, $$0 \leq r_1 < |fm|$$

and yet, when with the point of intersection between the lens surface adjacent to said deflection point side and the optical axis as the origin, the coordinates system of the x-axis is plotted in the direction of the optical axis and the coordinates system of the y-axis is plotted in the main scanning plane perpendicularly thereto and when the surface shape in the main scanning plane is expressed as a function $S_1(y)$ in which y is a variable and when the maximum effective diameter of said surface in the main scanning plane is Ymax, $S_1(y)$ is defined between 0 and 5 Ymax, and when $r_1 < Ymax$, $$-1 < S_1(r_1)/r_1 < 0.5$$

and when $r_1 > Ymax$, $$-1 \times Ymax/r_1 < S_1(Ymax)/Ymax < 0.5 \times Ymax/r_1.$$

13. A scanning optical system according to claim 12, wherein when the thickness of the fθ lens of the second optical system on the optic axis thereof is t and the effective scanning width on the plane to be scanned is L, $0 < t/L < 0.08.$ 14. A scanning optical system according to claim 12, wherein when the thickness of the fθ lens of the second optical system on the optical axis thereof is t and the distance from the deflection point to the plane to be scanned is g, $0 < t/g < 0.15.$ 15. A scanning optical system according to claim 12, wherein the focal length fm of the fθ lens of the second optical system near the optical axis in the main scanning plane and the distance g from the deflection point to the plane to be scanned are $|fm|/g > 0.8.$ 16. A scanning optical system according to claim 12, wherein the fθ lens of the second optical system is an fθ lens in which the shape of the lens near the optical axis is a meniscus lens convex toward the deflection point side in at least the main scanning plane.

17. A scanning optical system according to claim 12, wherein the light beam emerging from the first optical system is substantially convergent light in at least the main scanning plane.

18. A scanning optical system according to claim 17, wherein the light beam emerging from the first optical system is substantially convergent light in at least the main scanning plane, and the distance p from the deflection point to a point at which said convergent light is imaged in the main scanning plane and the distance g from the deflection point to the plane to be scanned are $0.7 < p/g.$ 19. A scanning optical system according to claim 12, wherein the light beam emerging from the first optical system is substantially parallel light in at least the main scanning plane.

20. A scanning optical system according to claim 12, wherein the fθ lens of the second optical system is an fθ lens in which with regard to at least one of a curved surface adjacent to the deflection point and a curved surface adjacent to the plane to be scanned, the radius of curvature near the optical axis differs between the main scanning cross-section and the sub-scanning cross-section.

21. A scanning optical system according to claim 20, wherein the fθ lens of the second optical system is such that with regard to at least one of the curved surface adjacent to the deflection point and the curved surface adjacent to the plane to be scanned, the radius of curvature of the curved surface of the lens determined in a plane containing a normal in the main scanning plane and perpendicular to the main scanning plane varies continuously in the effective portion of the lens.

22. A scanning optical system according to claim 20 or 21, wherein the light beam emerging from the first optical system is condensed substantially on the deflection point of the deflector in the sub-scanning cross-section and yet, the fθ lens of the second optical system is such that in the sub-scanning cross-section near the optical axis, the deflection point and the plane to be scanned are in an optically substantially conjugate relation.

23. A scanning optical system according to any one of claims 12 to 22, wherein a semiconductor laser is used as the light source.

24. A scanning optical system according to claim 12, incorporated as an input means to an image forming apparatus that effects an image formation.

* * * * *

UNITED STATES PATENT AND TRADEMARK OFFICE
CERTIFICATE OF CORRECTION

PATENT NO. : 5,111,219
DATED : May 5, 1992
INVENTOR(S) : JUN MAKINO

It is certified that error appears in the above-identified patent and that said Letters Patent is hereby corrected as shown below:

<u>Column 4</u>:

Line 68, "$0 \geq r_1 < |fm|$  (1) should read --$0 \leq r_1 < |fm|$  (1)--.

<u>Column 7</u>:

Line 46, "exist surface" should read --exit surface--.

<u>Column 9</u>:

Line 26, "plane" should read --plane.--.

<u>Column 11</u>:

Line 60, "TABLF 7" should read --TABLE 7--.

<u>Column 13</u>:

Line 60, "TABLE 5 should read --TABLE 11--.

UNITED STATES PATENT AND TRADEMARK OFFICE
CERTIFICATE OF CORRECTION

PATENT NO. : 5,111,219

DATED : May 5, 1992

INVENTOR(S) : JUN MAKINO

Page 2 of 2

It is certified that error appears in the above-identified patent and that said Letters Patent is hereby corrected as shown below:

Column 19:

Line 27, "$r_1$ 24 Ymax," should read --$r_1 \geq$ Ymax--.

Line 42, "0 < t/g < 0.15" should read -- 0 < t/g < 0.15.--.

Line 49, "|fm|/g > 0.8" should read --|fm|/g > 0.8.--

Column 20:

Line 61, "5 Ymax," should read --Ymax,--.

Signed and Sealed this

Ninth Day of November, 1993

BRUCE LEHMAN

*Attest:*

*Attesting Officer*      Commissioner of Patents and Trademarks